United States Patent
Handa

(10) Patent No.: US 11,790,130 B2
(45) Date of Patent: Oct. 17, 2023

(54) OPTIMIZATION DEVICE, OPTIMIZATION METHOD, AND NON-TRANSITORY COMPUTER-READABLE STORAGE MEDIUM FOR STORING OPTIMIZATION PROGRAM

(71) Applicant: FUJITSU LIMITED, Kawasaki (JP)

(72) Inventor: Satoshi Handa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 471 days.

(21) Appl. No.: 17/168,557

(22) Filed: Feb. 5, 2021

(65) Prior Publication Data

US 2021/0365605 A1    Nov. 25, 2021

(30) Foreign Application Priority Data

May 21, 2020  (JP) ................................ 2020-088882

(51) Int. Cl.
*G06F 30/20*     (2020.01)
*G06F 17/18*     (2006.01)
(Continued)

(52) U.S. Cl.
CPC .............. *G06F 30/20* (2020.01); *G06F 17/18* (2013.01); *G06N 7/08* (2013.01); *G06F 2119/08* (2020.01)

(58) Field of Classification Search
CPC ...... G06F 30/20; G06F 17/18; G06F 2119/08; G06N 7/08
See application file for complete search history.

(56) References Cited

U.S. PATENT DOCUMENTS

2003/0144748 A1*  7/2003  Nakamura ........... G05B 13/024
                                                  700/28
2016/0063391 A1*  3/2016  Hayashi .................. G06F 7/588
                                                  706/11
(Continued)

FOREIGN PATENT DOCUMENTS

CA      3111975 A1    3/2020
EP      3637202 A1    4/2020
(Continued)

OTHER PUBLICATIONS

Zhang BW, Dai W, Gallicchio E, He P, Xia J, Tan Z, Levy RM. Simulating replica exchange: Markov state models, proposal schemes, and the infinite swapping limit. The Journal of Physical Chemistry B. Aug. 25, 2016;120(33):8289-301. (Year: 2016).*
(Continued)

*Primary Examiner* — Chuen-Meei Gan
(74) *Attorney, Agent, or Firm* — Fujitsu Patent Center

(57) ABSTRACT

An optimization method includes: identifying, for each of a plurality of replicas each of which has a plurality of state variables, an amount of change in strength of interaction that corresponds to a change in a distance between the replica and another replica in a state space in a case where a value of a first state variable among the plurality of state variables of the replica is updated, the state space indicating a space which a combination of values of the plurality of state variables is able to take; and determining whether or not to update the value of the first state variable, based on a proposal probability that corresponds to the amount of change in the strength of interaction in the case where the value of the first state variable is updated and based on an acceptance probability that corresponds to a target probability distribution.

12 Claims, 21 Drawing Sheets

(51) Int. Cl.
  *G06N 7/08* (2006.01)
  *G06F 119/08* (2020.01)

(56) References Cited

U.S. PATENT DOCUMENTS

| | | |
|---|---|---|
| 2018/0005114 A1 | 1/2018 | Tomita et al. |
| 2019/0130295 A1 | 5/2019 | Okuyama et al. |
| 2019/0286077 A1 | 9/2019 | Koyama et al. |
| 2020/0090026 A1 | 3/2020 | Shibasaki |
| 2020/0117697 A1 | 4/2020 | Miyazawa et al. |

FOREIGN PATENT DOCUMENTS

| | | |
|---|---|---|
| JP | 2018-005541 A | 1/2018 |
| JP | 2019-071119 A | 5/2019 |
| JP | 2019-082793 A | 5/2019 |
| JP | 2019-194765 A | 11/2019 |
| JP | 2020-061012 A | 4/2020 |

OTHER PUBLICATIONS

Sakellariou J. Inverse inference in the asymmetric ising model (Doctoral dissertation, Université Paris Sud-Paris XI). (Year: 2013).*

Extended European Search Report dated Jul. 13, 2021 for corresponding European Patent Application No. 21153978.8, 8 pages.

Gregoire Clarte et al., "Collective Sampling Through a Metropolis-Hastings Like Method: Kinetic Theory and Numerical Experiments", arXiv:1909.08988v1 [math.ST], pp. 1-30, Sep. 18, 2019 (Total 30 pages).

Carlo Baldassi et al., "Unreasonable Effectiveness of Learning Neural Networks: From Accessible States and Robust Ensembles to Basic Algorithmic Schemes", PNAS, pp. E7655-E7662, Published online, Nov. 15, 2016 (Total 8 pages).

* cited by examiner

FIG. 8

OPTIMIZATION DEVICE, OPTIMIZATION METHOD, AND NON-TRANSITORY COMPUTER-READABLE STORAGE MEDIUM FOR STORING OPTIMIZATION PROGRAM

CROSS-REFERENCE TO RELATED APPLICATION

This application is based upon and claims the benefit of priority of the prior Japanese Patent Application No. 2020-88882, filed on May 21, 2020, the entire contents of which are incorporated herein by reference.

FIELD

The embodiments discussed herein are related to an optimization device, an optimization method, and a non-transitory computer-readable storage medium storing an optimization program.

BACKGROUND

As a problem which the Neumann-type computer does not handle well, there is a large-scale discrete optimization problem. As a device that performs computation of a discrete optimization problem, for example, there is an Ising machine (also referred to as a Boltzmann machine) that uses an Ising-type evaluation function (also referred to as an energy function or the like).

In computation performed by an Ising machine, a problem subjected to computation is replaced with an Ising model that is a model representing behaviors of spins in a magnetic body. A search for a state in which the value of the Ising-type evaluation function (equivalent to energy in the Ising model) is minimized is performed using the Markov chain Monte Carlo method. Hereinafter, the Markov chain Monte Carlo method is abbreviated as the MCMC method. In the MCMC method, a state transition is accepted with an acceptance probability of the state transition defined by, for example, the Metropolis method or the Gibbs method.

As one type of the MCMC method, there is a replica exchange method (also referred to as an exchange Monte Carlo method or a parallel tempering method). The replica exchange method is a method in which MCMC processes using a plurality of temperatures are performed independently from each other and, every certain number of trials, an operation of comparing energies obtained in the respective MCMC processes with each other and exchanging states for two temperatures at an appropriate probability is performed. Compared with a simulated annealing method in which the temperature is gradually decreased, the replica exchange method reduces the possibility of being trapped in a local solution and enables an efficient search of the entire search space.

As a technique related to the solution search, an optimization device has been proposed which suppresses a change in convergence characteristics due to parallelization of the transition candidate search and suppresses deterioration in accuracy of a solution by bringing the energy distribution of states in a search process closer to a Boltzmann distribution. As a technique related to the replica exchange method, for example, an Ising machine that reduces computation time has been proposed. An optimization device has also been proposed that suppresses an increase in circuit scale of an optimization device that performs a simulated annealing operation based on the replica exchange method. An information processing apparatus has also been proposed that enables a stochastic process based on the Metropolis method while reducing a physical quantity of a circuit. As techniques of performing a solution search using a plurality of replicas, a method called collective Monte Carlo (CMC) and a method called robust ensemble (RE) have also been proposed.

Examples of the related art include Japanese Laid-open Patent Publication No. 2020-061012, Japanese Laid-open Patent Publication No. 2018-005541, Japanese Laid-open Patent Publication No. 2019-194765, and Japanese Laid-open Patent Publication No. 2019-082793.

Examples of the related art include Gregoire Clarte and Antoine Diez, "Collective sampling through a Metropolis-Hastings like method: kinetic theory and numerical experiments", arXiv:1909.08988v1 [math.ST], 18 Sep. 2019 and Baldassi, Carlo, et al, "Unreasonable Effectiveness of Learning Neural Networks: From Accessible States and Robust Ensembles to Basic Algorithmic Schemes", PNAS E7655-E7662, Published online 15 Nov. 2016.

SUMMARY

According to an aspect of the embodiments, provided is an optimization method implemented by an optimization device. In an example, the optimization method includes: identifying, for each of a plurality of replicas each of which has a plurality of state variables, an amount of change in strength of interaction that corresponds to a change in a distance between the replica and another replica in a state space in a case where a value of a first state variable among the plurality of state variables of the replica is updated, the state space indicating a space which a combination of values of the plurality of state variables is able to take; and determining whether or not to update the value of the first state variable, based on a proposal probability that corresponds to the amount of change in the strength of interaction in the case where the value of the first state variable is updated and based on an acceptance probability that corresponds to a target probability distribution.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 describes a 2W1H constraint;

DESCRIPTION OF EMBODIMENT(S)

In order to increase the speed of the MCMC method, various methods for performing a population-based search using many replicas have been proposed. However, in any of the methods, the effect of the population-based search may not be sufficiently exerted. For example, in the case where the way in which a transition destination candidate is selected is a single-bit flip (a value of one of a plurality of bits is inverted), each bit is selected as an inversion target with an equal probability. A transition probability to a state in which the selected bit is inverted is determined by an energy difference before and after the transition. Therefore, each replica changes the state simply in accordance with the energy gradient, and the process of the state transition may follow the same path. As a result, a plurality of replicas stay at the same local solution, and a state space may not be searched sufficiently widely.

Such a problem occurs similarly in an optimization problem in which state variables may take continuous values as well as in the case where values of the state variables are discrete.

In one aspect of embodiments, provided is a technical solution to improve the solution search capability in the case where a plurality of replicas are used.

Embodiments will be described below with reference to the drawings. Each of the embodiment may be implemented by combining a plurality of embodiments in a range not causing any contradiction.

First Embodiment

Figure 1:
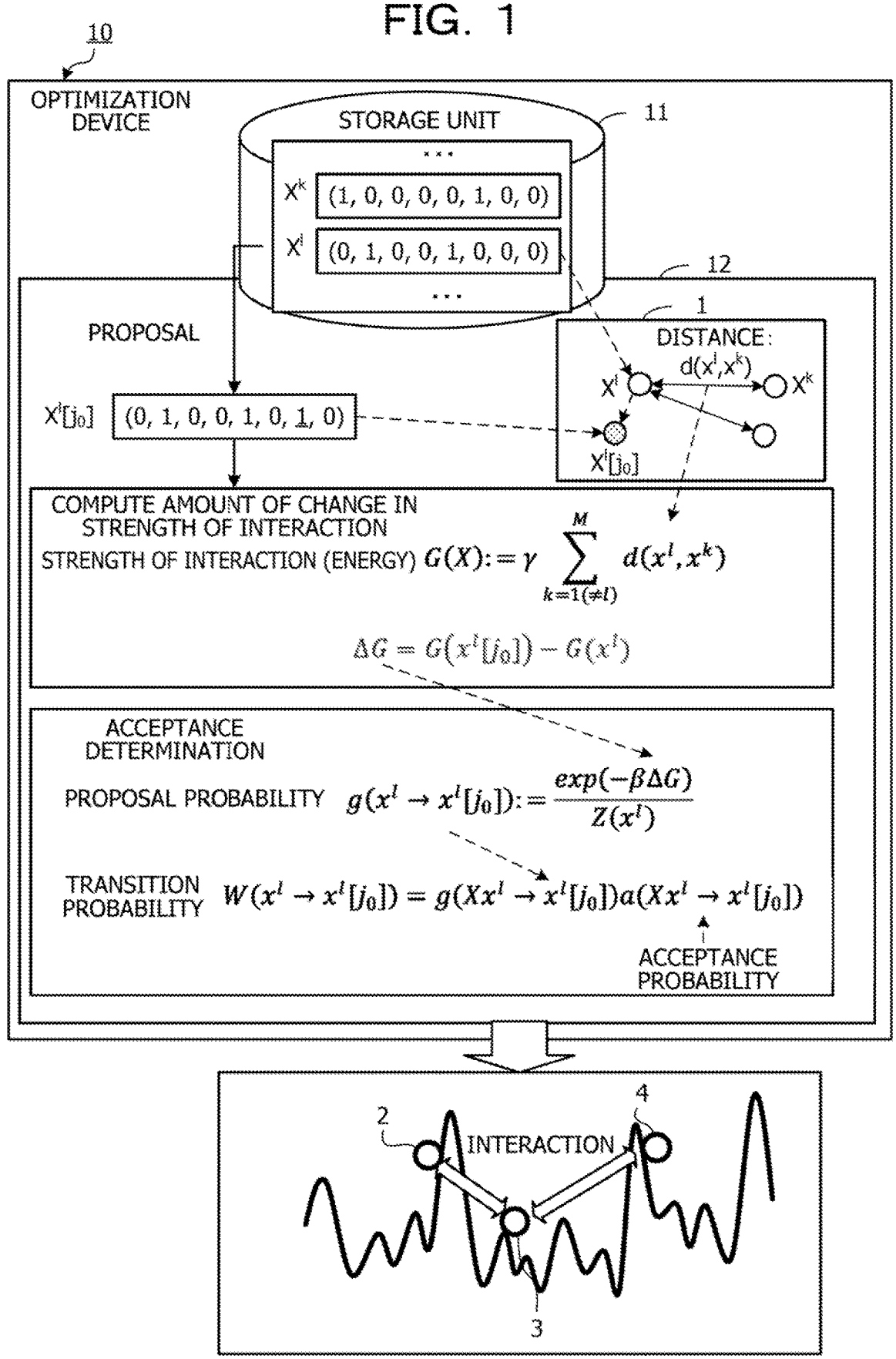
FIG. 1 illustrates an example of an optimization method according to a first embodiment.

FIG. 1 illustrates an example of an optimization method according to a first embodiment. FIG. 1 illustrates an optimization device 10 that implements a solution search method. The optimization device 10 may be a Neumann-type computer or may be a non-Neumann-type computer. For example, by executing a program for optimization, the optimization device 10 is able to implement the optimization method. The optimization device 10 may be an Ising machine that solves an optimization problem using the Ising model. The Ising machine includes a quantum computer using quantum bits, a device that reproduces a quantum phenomenon of quantum bits with a digital circuit, or the like.

The optimization device 10 includes a storage unit 11 and a processing unit 12. The storage unit 11 is, for example, a memory or a storage device included in the optimization device 10. The processing unit 12 is, for example, a processor or an arithmetic circuit included in the optimization device 10. The arithmetic circuit includes neuron circuits that reproduce quantum bits or a mechanism of quantum bits.

The storage unit 11 stores values of a plurality of state variables of each of a plurality of replicas 2 to 4.

The processing unit 12 solves the optimization problem by using the plurality of replicas 2 to 4. For example, the processing unit 12 determines values of the state variables that minimize a value of an objective function defined according to the optimization problem. The objective function may also be referred to as energy of a model that represents the optimization problem. In the case where the optimization problem is represented by the Ising model, the Hamiltonian of the Ising model is equivalent to the objective function that represents energy.

For a solution search, the processing unit 12 repeats the state transition (updating of the values of the state variables) for each of the plurality of replicas 2 to 4, and computes the value of the objective function based on the values of the plurality of state variables in the generated state. At that time, the processing unit 12 performs the state transition of the replicas in consideration of interaction between the replicas. As interaction between replicas, for example, attraction or repulsion according to a distance between the replicas are conceived. The distance between a k-th replica $x^k$ and an l-th replica $x^l$ is represented by $(x^k, x^l)$ (where k and l are integers of 1 or greater). For example, the processing unit 12 performs the state transition for each of the plurality of replicas 2 to 4 in a following manner.

The processing unit 12 identifies an amount of change in strength of interaction that corresponds to a change in distance between a replica and an other replica in a state space 1 which indicates a space which a combination of the values of the plurality of state variables is able to take in a case where a value of a first state variable among the plurality of state variables of the replica is updated. The strength of the interaction is, for example, a value based on a sum of distances between the replica and the other replicas. The strength of the interaction may also be referred to as energy $G(x)$ of the interaction. The strength of the interaction may be represented by, for example, Equation (5) or Equation (16) described later. The amount of change in the strength of the interaction in a case where a $j_0$-th state variable of an l-th replica is updated may be represented as $\Delta G=G(x^l[j_0])-G(x^l)$.

The processing unit 12 determines whether or not to update the value of the first state variable in the case where the value of the first state variable (for example, the $j_0$-th state variable) is updated. This determination is stochastically performed based on a proposal probability $(g(x^l \rightarrow x^l[j_0]))$ that corresponds to the amount of change in strength of interaction and an acceptance probability $(a(x^l \rightarrow x^l[j_0]))$ that corresponds to a target probability distribution. The target probability distribution is, for example, a Gibbs distribution. A transition probability with which the replica makes state transition based on the proposal probability and the acceptance probability conforms to, for example, the Metropolis-Hastings method.

If the processing unit 12 determines to update the value of the first state variable, the processing unit 12 computes the value of the objective function based on the values of the plurality of state variables of the replica obtained after the value of the first state variable is updated. The processing unit 12 updates the value of the first state variable of the replica in the storage unit 11. The processing unit 12 repeats the updating of the value of one state variable among the plurality of state variables of each of the plurality of replicas 2 to 4, and outputs the values of the plurality of state variables obtained when the value of the objective function satisfies a predetermined condition. For example, the processing unit 12 repeats updating for the plurality of replicas 2 to 4 a predetermined number of times, and outputs a combination of the values of the plurality of state variables that minimizes the value of the objective function.

In this manner, a solution is searched through the state transitions of the replicas made in consideration of the interaction between the replicas. For example, the optimization device 10 may comprehensively search the state space 1 using the plurality of replicas 2 to 4 by taking the interaction between the replicas into consideration. The optimization device 10 may incorporate an influence of the interaction between the replicas into computation in an appropriate form by using the Metropolis-Hastings method.

The processing unit 12 defines an appropriate distance for the state space 1 and determines the distance between replicas. The processing unit 12 determines the strength of the interaction between the replicas by using the distance, defines a distribution (proposal distribution) of transition candidate destinations in the Metropolis-Hastings method, and incorporates the distribution into computation. The Metropolis-Hastings method corresponds to a case where the proposal distribution is asymmetric. Therefore, there is a degree of freedom in a way of determining the proposal distribution. Accordingly, the processing unit 12 introduces the interaction between replicas into the proposal probability by using the degree of freedom in the proposal distribution (definition of the proposal probability) in the Metropolis-Hastings method.

As the interaction between the replicas, for example, repulsive interaction may be generated. In this case, the processing unit 12 increases the strength of the interaction if the distance between the replica serving as the state transition determination target and the other replica increases in response to updating of the value of the first state variable. The processing unit 12 increases the proposal probability more as an amount of increase in strength of the interaction is larger. The processing unit 12 increases the probability of the state variable being selected as a value updating candidate for the state variable having a higher proposal probability. As a result, for example, a situation may be suppressed in which the plurality of replicas 2 to 4 are trapped in and unable to escape from the same local solution.

As the interaction between replicas, attractive interaction may also be generated. In this case, the processing unit 12 increases the strength of the interaction if the distance between the replica serving as the state transition determination target and the other replica decreases in response to updating of the value of the first state variable. The processing unit 12 increases the proposal probability more as an amount of increase in strength of the interaction is larger. This allows the replica that is trapped in and fails to escape from the local solution to escape from the local solution with attraction from the other replica.

In the case where the state space 1 is discrete and the value of the state variable may take just two values (for example, "1" or "0"), for example, a Hamming distance (or a monotonically increasing function thereof) may be used as the distance between two replicas. In this case, the processing unit 12 defines the Hamming distances between all replicas, and computes the strength of interaction between the replicas based on the Hamming distances. The distance between replicas may be represented by Equation (19) described later.

The processing unit 12 normalizes the proposal probability of updating the value of the first state variable by, for example, a normalization constant. For example, let $\Delta G$ denote the amount of change in strength of the interaction in response to updating of the value of the first state variable, and let $\beta$ denote an inverse temperature which is a reciprocal of a value of a temperature parameter set in the replica. At this time, the processing unit 12 uses, as the proposal probability, a value obtained by dividing $\exp(-\beta \Delta G)$ by a predetermined normalization constant. This proposal probability may be represented by, for example, Equation (17) described later. $\exp(-\beta \Delta G)$ represents a Gibbs distribution, and the use of the Gibbs distribution in definition of the proposal probability makes it easier for the objective function (energy) to maintain the Gibbs distribution.

The processing unit 12 may use, as the proposal probability, a value obtained by dividing the smaller value among 1 and $\exp(-\beta \Delta G)$ by a predetermined normalization constant. This proposal probability may be represented by, for example, Equation (18) described later. Thus, if the value of $\exp(-\beta \Delta G)$ exceeds 1, the value is regarded as 1. This consequently may reduce a difference in the influence on the proposal probability in the case where the amount of change in strength of the interaction is largely different between the state variables.

The normalization constant will be described. With the proposal distribution of the related art, a plurality of state variables are selected as transition candidates with an equal probability (1/N) (where N is an integer of 1 or greater and represents the number of state variables). In this case, the normalization constant is N (which means that the weights of the individual transition destinations are equal to 1 in common). In the optimization device 10 illustrated in FIG. 1, the transition probabilities of the respective state variables serving as transition candidates are different, and the normalization constant depends on the present state before the transition. Thus, the processing unit 12 computes the normalization constant.

For example, the processing unit 12 uses, as the normalization constant, a total sum of values of $\exp(-\beta \Delta G)$ obtained for the plurality of state variables in a case where each of the plurality of state variables is set as the first state variable. This normalization constant may be represented by, for example, Equation (23) described later. If the interaction is represented by a linear function of the Hamming distance, the processing unit 12 may compute, for each state transition of the replica, a difference in the normalization constant before and after the state transition, compute a cumulative value of the differences (cumulative computation), and use the cumulative value as the latest normalization constant. The linear function of the Hamming distance is a function as represented by Equation (19) described later.

When performing the cumulative computation of the normalization constant, the processing unit 12 stores, in the storage unit 11, the normalization constant used in determination of the state variable to be updated every time the replica is caused to make the state transition. Based on the value of the normalization constant used in the last state transition of the replica and the difference between the values of the normalization constant generated before and after the last state transition, the processing unit 12 computes the value of the normalization constant used in the present state transition. The difference between the values of the normalization constant generated before and after the previous state transition is represented by, for example, Equation (24) described later. Thus, the normalization constant may be efficiently computed.

The processing unit 12 may use, as the strength of interaction, a value based on a sum of square roots of the distances between the replica and the other replicas. The strength of interaction in this case is represented by, for example, Equation (16) described later. Thus, the interaction from the other replica in a short distance may be made act relatively more strongly than the interaction from the other replica in a long distance. For example, in the case where a situation in which the plurality of replicas 2 to 4 are trapped in the same local solution is suppressed, an escape from the local solution may be promoted by making strong repulsion act between replicas existing in the vicinity of the local solution. In this case, the smaller the influence from the replica at a position far away from the local solution is, the easier the escape from the local solution becomes.

The processing unit 12 may also identify state variables for which updating of the value is acceptable from among the plurality of state variables first, and may determine a state variable for which the value is updated in the present state transition of the replica from among the identified state variables. In this case, the processing unit 12 stochastically determines, for each of the plurality of state variables, based on the acceptance probability, whether or not to accept updating of the state variable in a case where the updating is proposed. From among the state variables for which it is determined that the updating is accepted, the processing unit 12 determines at least one state variable as an update target by increasing a selection possibility for a state variable having a higher proposal probability. Thus, a situation may be suppressed in which it takes time to determine a state variable for which the value is updated because of repeated rejection of updating of the value of the selected state variable (determination that updating is not accepted).

Second Embodiment

A second embodiment will be described next. The second embodiment is an example of a system using an Ising machine that computes a combination of values of state variables that minimizes a value of an objective function. The Ising machine according to the second embodiment is an example of the optimization device 10 described in the first embodiment. In the Ising machine, a problem to be solved is represented by an Ising model, and a combination of values of bits that minimizes energy of the Ising model is searched for. An Equation (Hamiltonian) for computing the energy of the Ising model is an objective function.

Figure 2:
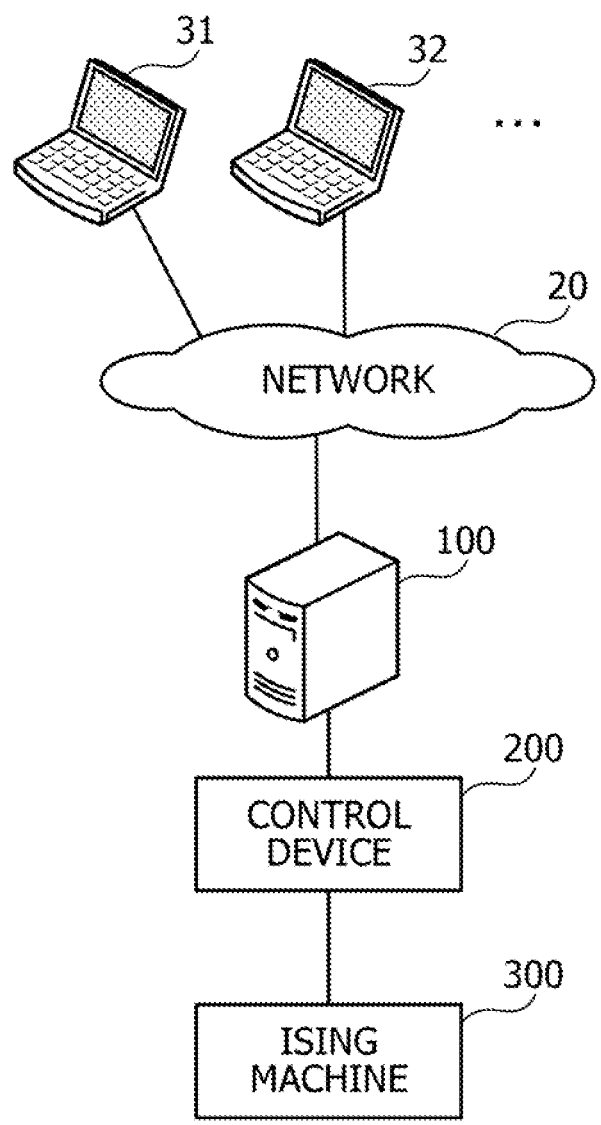
FIG. 2 illustrates an example of a system configuration according to a second embodiment.

FIG. 2 illustrates an example of a system configuration according to a second embodiment. Terminal devices 31, 32, are coupled to a server 100 via a network 20. The terminal devices 31, 32, . . . are computers used by users who give a request for solving a combinatorial optimization problem. The server 100 accepts a request for solving the combinatorial optimization problem from the terminal devices 31, 32, . . . and generates the Hamiltonian which is an energy function of the Ising model corresponding to the combinatorial optimization problem. A control device 200 for an Ising machine 300 is coupled to the server 100. The server 100 inputs, to the control device 200, a search request for the minimum value of energy by using the generated Hamiltonian.

The control device 200 controls the Ising machine 300, and performs a solution search for the minimum value of energy in response to the search request input from the server 100. For example, the control device 200 transmits, as coupling destination information, an id of a coupling destination neuron of each neuron to the Ising machine 300. The control device 200 transmits an initial value of a local field (for example, a bias factor), a weight factor whose value is not 0, an annealing condition, and the like to the Ising machine 300.

Based on the control from the control device 200, the Ising machine 300 performs a state transition simulation of the Ising model using a digital circuit, and searches for the minimum value of energy.

Figure 3:
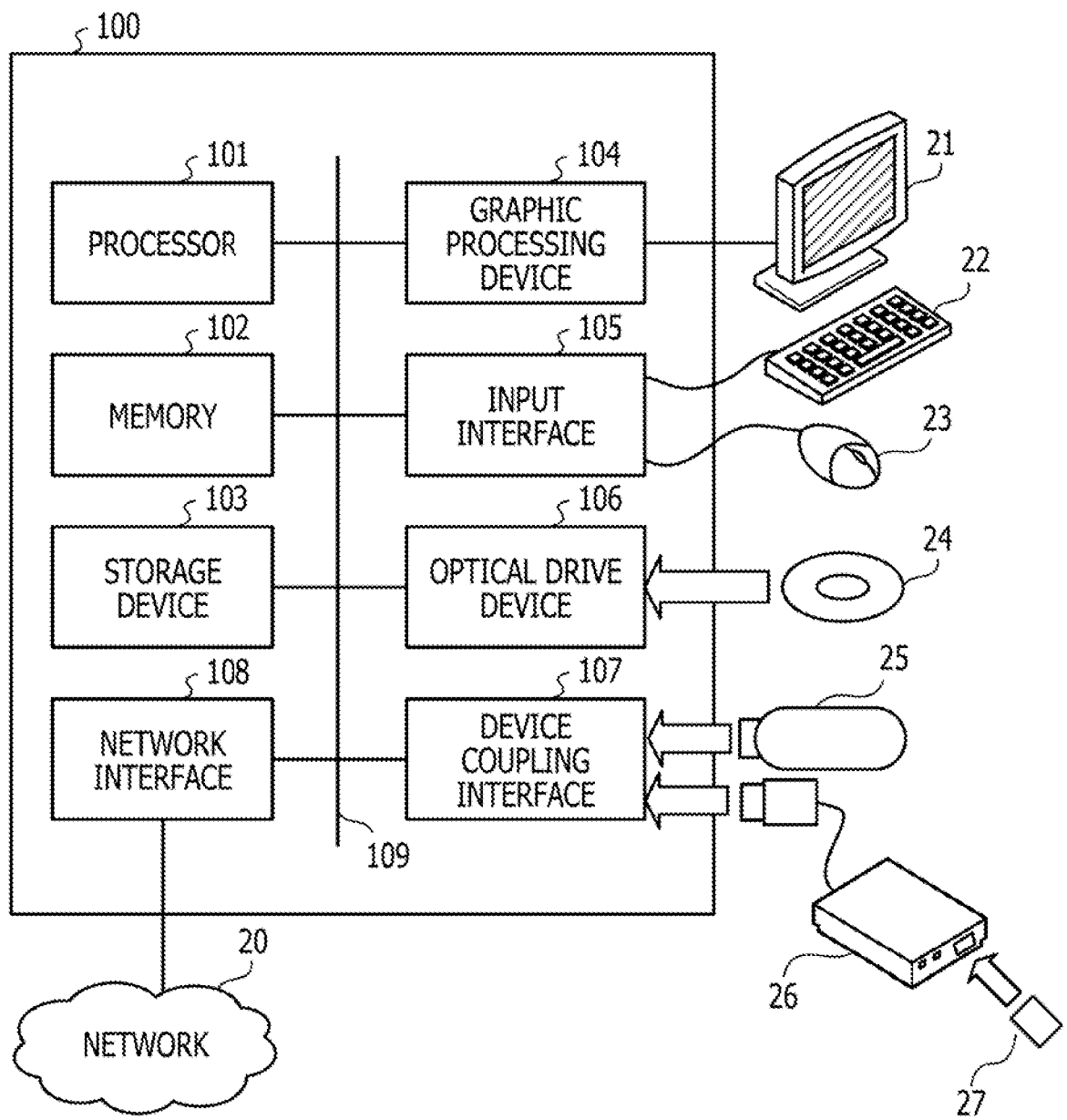
FIG. 3 illustrates an example of hardware of a server.

FIG. 3 illustrates an example of hardware of the server. A processor 101 controls the entire apparatus, namely, the server 100. A memory 102 and a plurality of peripheral devices are coupled to the processor 101 via a bus 109. The processor 101 may be a multiprocessor. The processor 101 is, for example, a central processing unit (CPU), a microprocessor unit (MPU), or a digital signal processor (DSP). At least some of functions implemented by the processor 101 executing a program may be implemented by an electronic circuit such as an application-specific integrated circuit (ASIC) or a programmable logic device (PLD).

The memory 102 is used as a main storage device of the server 100. The memory 102 temporarily stores at least some of programs of an operating system (OS) and application programs to be executed by the processor 101. The memory 102 also stores various pieces of data used in processes performed by the processor 101. As the memory 102, for example, a volatile semiconductor storage device such as a random-access memory (RAM) is used.

The peripheral devices coupled to the bus 109 include a storage device 103, a graphic processing device 104, an input interface 105, an optical drive device 106, a device coupling interface 107, and a network interface 108.

The storage device 103 electrically or magnetically writes and reads data to and from a recording medium built therein. The storage device 103 is used as an auxiliary storage device of a computer. The storage device 103 stores the programs of the OS, the application programs, and the various pieces of data. As the storage device 103, for example, a hard disk drive (HDD) or a solid-state drive (SSD) may be used.

A monitor 21 is coupled to the graphic processing device 104. The graphic processing device 104 causes an image to be displayed on a screen of the monitor 21 in accordance with an instruction from the processor 101. The monitor 21 may be a display device using organic electro luminescence (EL), a liquid crystal display device, or the like.

A keyboard 22 and a mouse 23 are coupled to the input interface 105. The input interface 105 transmits, to the processor 101, signals transmitted from the keyboard 22 and the mouse 23. The mouse 23 is an example of a pointing device. An other pointing device may be used. The other pointing device may be a touch panel, a tablet, a touch pad, a trackball, or the like.

The optical drive device 106 reads data recorded on an optical disc 24 or writes data to the optical disc 24 by using a laser beam or the like. The optical disc 24 is a portable recording medium on which data is recorded such that the data is readable through reflection of light. The optical disc 24 may be a digital versatile disc (DVD), a DVD-RAM, a compact disc read-only memory (CD-ROM), a CD-recordable (CD-R), a CD-rewritable (CD-RW), or the like.

The device coupling interface 107 is a communication interface for coupling a peripheral device to the server 100. For example, a memory device 25 and a memory reader/writer 26 may be coupled to the device coupling interface 107. The memory device 25 is a recording medium having a communication function of communicating with the device coupling interface 107. The memory reader/writer 26 is a device that writes data to a memory card 27 or reads data from the memory card 27. The memory card 27 is a card-type recording medium.

The network interface 108 is coupled to the network 20. The network interface 108 transmits and receives data to and from another computer or a communication device via the network 20. The network interface 108 is, for example, a wired communication interface that is coupled to a wired communication device such as a switch or a router by a cable. The network interface 108 may be a wireless communication interface that is wirelessly coupled to and communicates with a wireless communication device such as a base station or an access point by radio.

The hardware described above enables the server 100 to implement processing functions according to the second embodiment. The control device 200 may also be implemented by substantially the same hardware as the server 100.

Figure 4:
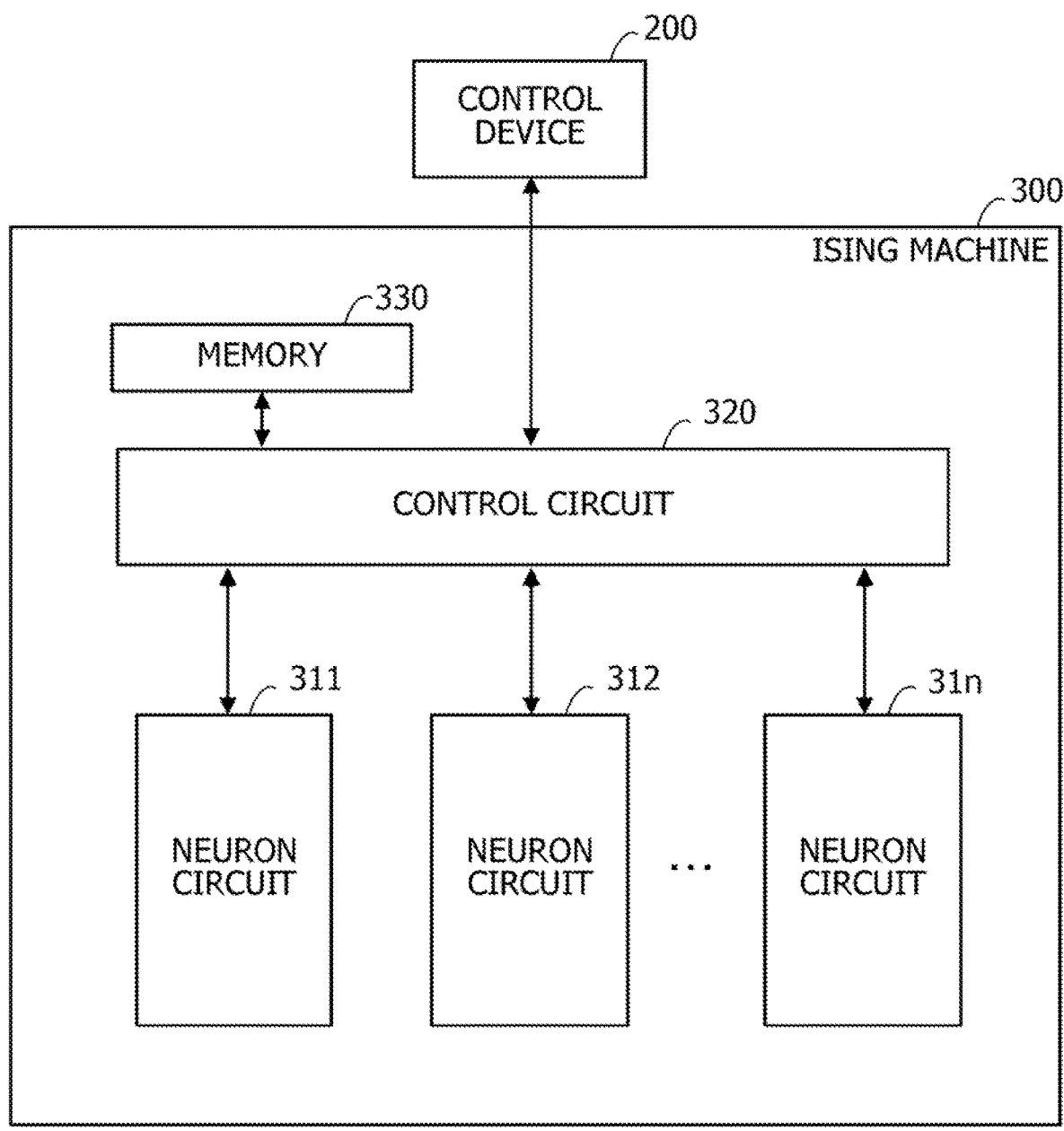
FIG. 4 illustrates an example of an Ising machine.

FIG. 4 illustrates an example of the Ising machine. The Ising machine 300 includes neuron circuits 311, 312, 31n, a control circuit 320, and a memory 330.

Each of the neuron circuits 311 to 31n computes a first value based on the total sum of products of values of a plurality of weight factors indicating the presence or absence of coupling to a plurality of other neuron circuits other than itself and a plurality of output signals of the plurality of other neuron circuits. Each of the neuron circuits 311 to 31n outputs a bit value of 0 or 1 based on a result of comparison between a threshold and a second value obtained by adding a noise value to the first value. In the case where a solution search using a plurality of replicas is performed, a solution search in one replica is performed using a plurality of neuron circuits.

The control circuit 320 performs an initial setting process or the like of the Ising machine 300 based on information supplied from the control device 200. In the case where the replica exchange is performed, the control circuit 320 determines whether or not the values of the temperature parameter are exchanged between two replicas. If the values of the temperature parameter are exchanged, the control circuit 320 updates the value of the temperature parameter input to the neuron circuits that perform the solution search in each of the replicas.

After a process of determining an update-target neuron is repeated a predetermined number of times, the control circuit 320 acquires the bit values of the respective neurons heled in the memory 330 in association with the state variables of the one replica, and transmits the bit values as a solution to the optimization problem to the control device 200.

The control circuit 320 may be implemented by, for example, an application-specific electronic circuit such as an ASIC or an FPGA. The control circuit 320 may be a processor such as a CPU or a DSP. In such a case, the processor performs the process described above by executing a program stored in a memory (not illustrated).

The memory 330 holds, for example, a bit value of each neuron. The memory 330 may be implemented by, for example, a register, a RAM, or the like. The memory 330 may also hold the minimum value of energy and the bit value of each neuron set when the minimum value of energy is obtained. In this case, after the process of determining an update-target neuron is repeated a predetermined number of times, the control circuit 320 may acquire from the memory 330 the minimum value of energy and the bit value of each neuron set when the minimum value is obtained, and may transmit the acquired minimum value of energy or the bit value of each neuron to the control device 200.

The optimization device 10 described in the first embodiment may also be implemented by substantially the same hardware as that of the Ising machine 300 illustrated in FIG. 4.

An Ising-type minimum value solving problem (Ising-type problem) to be solved will be described next. The Ising-type problem is represented by an Ising model.

Figure 5:
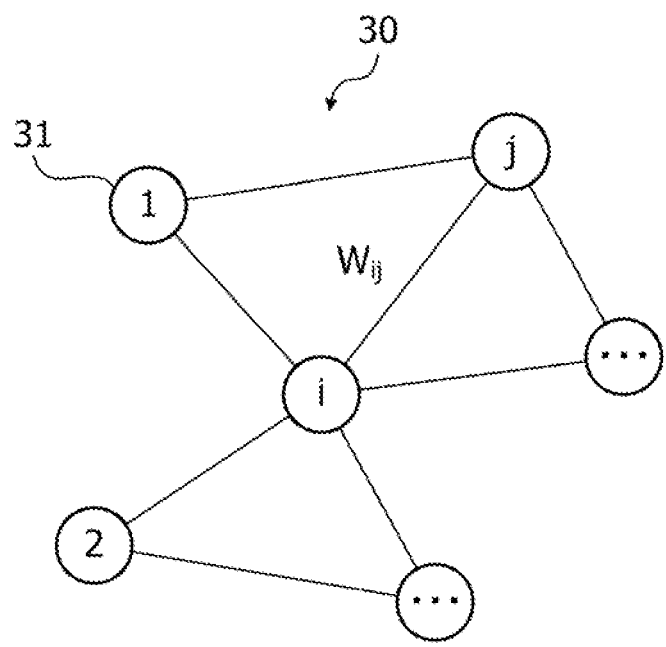
FIG. 5 is a schematic diagram of an Ising model.

FIG. 5 is a schematic diagram of the Ising model. In an Ising model 30, a plurality of bits 31 are arranged in a lattice shape. The bits 31 mimic magnets and are also referred to as spins. Interaction acts between adjacent bits. The magnitude of the interaction is represented by a weight factor. The energy of the Ising model 30 is represented by Equation (1) below.

$$E(x) = -\sum_{(i,j)} W_{ij} x_i x_j - \sum_i b_i \qquad (1)$$

The first term on the right side represents an accumulated value of products of values (0 or 1) of two state variables and a weight factor, for all combinations of N state variables without omission and overlapping. $x_i$ represents an i-th state variable, $x_j$ represents a j-th state variable, and $W_{ij}$ represent a weight factor indicating a magnitude of interaction between $x_i$ and $x_j$. The second term on the right side is the total sum of bias factors ($b_i$) for the respective state variables. When $W_{ij}$ is positive, interaction for making $x_i$ and $x_j$ have the same value acts. When $W_{ij}$ is negative, interaction for making $x_i$ and $x_j$ have different values acts. Note that $W_{ij}=W_{ji}$ and $W_{ii}=0$ hold.

The minimum value solving problem is a problem for determining the minimum value of energy given by Equation (1). The Ising machine 300 solves such a minimum value solving problem by using the MCMC. For example, the Ising machine 300 computes a change in energy in the case where one bit is inverted. In the case where the i-th bit is inverted "$x_i \rightarrow x_i' (\delta x_i = x_i' - x_j)$", the energy change value is represented by Equation (2).

$$\Delta E_i = E(x)|_{x_i \rightarrow x_i'} E(x) = -\delta x_i \left( \sum_j W_{ij} x_j + b_i \right) \qquad (2)$$

The Equation in parentheses on the right side of Equation (2) represents a local field (net input) of the i-th bit. If the sign of a change $\delta x_i$ in output matches the sign of the local field, the energy decreases. The Ising machine 300 determines whether or not to accept inversion of the i-th bit in accordance with an increase or decrease in the energy change value $\Delta E_i$. Equation (2) is an equation that holds true when one bit is inverted.

Equation (2) indicating an increase in energy may be rewritten as follows.

$$\Delta E_i = \begin{cases} +h_i & \text{for } x_j = 0 \to 1 \\ -h_i & \text{for } x_j = 1 \to 0 \end{cases} \quad (3)$$

$$h_i = \sum_j W_{ij} x_j + b_j \quad (4)$$

$h_i$ represents a local field of the i-th bit. A change $\delta h_i^{(j)}$ in the local field $h_i$ of the i-th bit in response to inversion of the j-th bit $x_j$ is represented by Equation (5) below.

$$\delta h_i^{(j)} = \begin{cases} +W_{ij} & \text{for } x_j = 0 \to 1 \\ -W_{ij} & \text{for } x_j = 1 \to 0 \end{cases} \quad (5)$$

A register that stores the local fields $h_i$ is prepared. By adding the value represented by Equation (5) to the stored local field h when the j-th bit is inverted, the correct $h_i$ is obtained all the time.

Through the computation described above, an increase in energy obtained if the i-th bit is inverted may be determined. The Ising machine 300 determines whether or not to accept inversion of the i-th bit based on the obtained increase in energy. For example, the Ising machine 300 determines whether or not to accept inversion of the bit in accordance with the Metropolis method. In the case where the determination is in accordance with the Metropolis method, inversion of the bit is accepted if the increase in energy is negative (energy decreases). If the increase in energy is positive (energy increases), it is determined whether or not to accept inversion of the bit based on a probability corresponding to the increase in energy.

The probability of inversion of the bit being accepted when the increase in energy is positive may be adjusted using a temperature parameter. For example, as the value of the temperature parameter is larger, the Ising machine 300 increases the probability of inversion of the bit inversion being accepted when the increase in energy is positive. This may consequently increase, by increasing the value of the temperature parameter, the possibility of the energy state of the Ising model escaping from the local solution.

When T represents the temperature parameter, an inverse temperature is set as $\beta=1/T$. For example, the Ising machine 300 performs a stochastic search by determining the acceptance probability of the state transition of the i-th state variable in accordance with Equation (6) below by using an energy change value $\Delta E_{ij}$ and the inverse temperature $\beta$.

$$A(\Delta E_i, \beta) = f(-\beta \Delta E_i) \quad (6)$$

A function f(x) in Equation (6) is represented by Equation (7) below in the Metropolis method.

$$f(x) = \min(1, e^x) \quad (7)$$

When the value of the temperature parameter is large, it becomes difficult to perform a focal search. Therefore, the Ising machine 300 performs a solution search using, for example, a plurality of replicas having different values of the temperature parameter. In this case, the Ising machine 300 may perform replica exchange.

Figure 6:
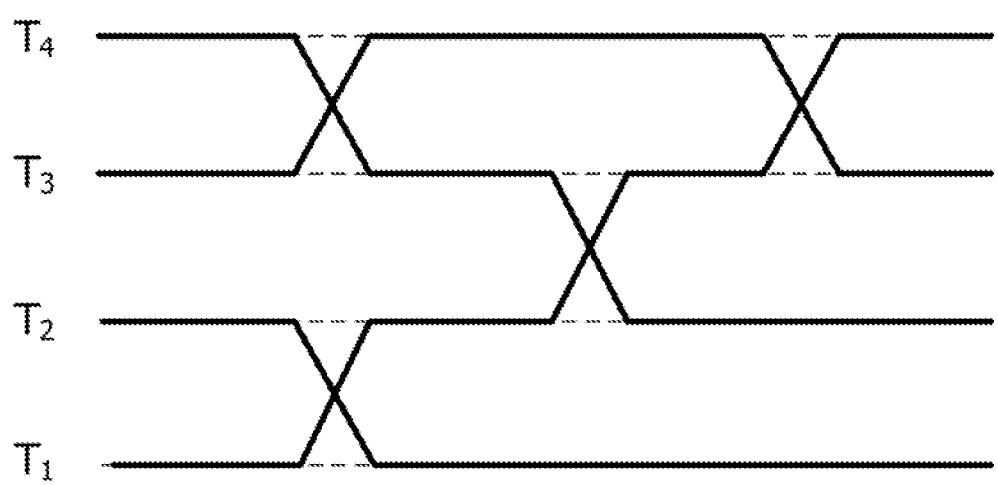
FIG. 6 illustrates an example of replica exchange.

FIG. 6 illustrates an example of replica exchange. In replica exchange, a plurality of replicas are used. A replica is a copy of a set of state variables of a problem to be solved. The Ising machine 300 sets different values for the temperature parameter of the respective replicas. In the example of FIG. 6, $T_1$, $T_2$, $T_3$, and $T_4$ are set as the temperature parameters of four replicas, respectively ($T_1 < T_2 < T_3 < T_4$).

The Ising machine 300 changes the state of each of the plurality of replicas in accordance with the MCMC. The Ising machine 300 then exchanges, in accordance with a predetermined probability, the values of the temperature parameter between adjacent replicas obtained when the replica are arranged by the value of the temperature parameter. Then, each replica randomly walks in the temperature axis direction. Because the replica randomly walks, even if the replica is trapped in the local solution, there is a possibility that the replica may escape from the local solution when the replica moves to the high temperature side. When the replica moves to the low temperature side, a local search may also be performed.

Performing a population-based search using many replicas as in replica exchange may speed up a solution search based on the Monte Carlo method. However, simply performing a population-based search by using a plurality of replicas is not enough to overcome an issue that the plurality of replicas stay at the same local solution and a state space may not be searched sufficiently widely. For example, when the number of state variables (bits) of the Ising model is equal to N, $2^N$ states exist in the state space. Therefore, when the number of state variables increases, it is difficult to receive the benefit of the population-based search even if the search is performed with a practically possible number of replicas.

Accordingly, the Ising machine 300 performs an efficient search in the state space by transitioning the states of the replicas using interaction corresponding to distances between the replicas. This consequently improves the solution search performance of the population-based search using the plurality of replicas.

For example, when replica exchange is performed, a wide range in the state space may be searched. However, when interaction between replicas is not taken into consideration, each replica just independently performs bit flip (Markov chain) in accordance with the value of the temperature parameter at that time. If interaction between replicas is used, a situation may be suppressed in which a plurality of replicas simultaneously stay at the same local solution in the Markov chain of the individual replicas.

In the case of the single-bit flip, when N bits are selected with an equal probability as a method of selecting candidates for the transition destination, the transition probability is determined by the energy change value $\Delta E_i$ alone. In this case, since each replica changes the state simply in accordance with the energy gradient, a possibility that the process of the state transition follows the same path and the state space may not be searched sufficiently widely is high. It is also difficult to escape when all replicas are trapped in the same local solution ($\Delta E_i > 0$ for all the bits i).

The Ising machine 300 uses the Metropolis-Hastings method, instead of the Metropolis method, in computation of the acceptance probability of whether or not to accept the transition. Thus, an influence of interaction between replicas may be incorporated into the computation in an appropriate form.

For example, let $g(X \to X')$ denote a probability of proposing the next state X' from the present state X, and let. $A(X \to X')$ denote the probability of this state transition being accepted. A probability $W(X \to X')$ of transition from the state X to the state X is obtained by Equation (8) below.

$$W(X \to X') = g(X \to X') A(X \to X') \quad (8)$$

Let n(X) denote a function (objective function) representing a target probability distribution (for example, the Gibbs distribution). Then, a detailed balance condition is as follows.

$$\pi(X)W(X \to X') = \pi(X')W(X' \to X) \quad (9)$$

$$\therefore \pi(X)g(X \to X')A(X \to X') = \pi(X')g(X' \to X)A(X' \to X) \quad (10)$$

From Equation (10), the acceptance probability that satisfies the detailed balance is as represented by Equation (11).

$$A(X \to X')/A(X' \to X) = [g(X' \to X)/g(X \to X')] \cdot [\pi(X')/\pi(X)] \quad (11)$$

When the Metropolis-Hastings method is used, the acceptance probability is given by Equation (12) below.

$$A(X \to X') = \min\left[1, \frac{g(X' \to X)\pi(X')}{g(X \to X')\pi(X)}\right] \quad (12)$$

This acceptance probability satisfies the detailed balance condition even when the proposal probability is asymmetric and is $g(X \to X') \neq g(X' \to X)$. When the proposal probability is symmetric and is $g(X \to X') = g(X' \to X)$, the acceptance probability of the Metropolis method as represented by Equation (13) is obtained.

$$A(X \to X') = \min\left[1, \frac{\pi(X')}{\pi(X)}\right] \quad (13)$$

In the case where the single-bit flip is considered, if interaction between replicas is not taken into consideration, N bits are selected as inversion candidates with an equal probability. Thus, the proposal probability is represented by Equation (14).

$$g(X \to X') = \frac{1}{N} \quad (14)$$

The Metropolis-Hastings method corresponds to a case where the proposal distribution indicated by the proposal probability is asymmetric. Therefore, there is a degree of freedom in a way of determining the proposal distribution. Therefore, the Ising machine 300 introduces interaction between replicas into the proposal probability.

For example, the Ising machine 300 defines an appropriate distance for a state space which is a discrete space, and determines a distance between replicas. The Ising machine 300 determines interaction between the replicas by using the distance between the replicas, defines a distribution (proposal distribution) of transition candidate destinations in the Metropolis-Hastings method, and incorporates the distribution in computation of the acceptance probability.

As an example of the distance between replicas, there is a Hamming distance (or a monotonically increasing function thereof) between states of two replicas. The Ising machine 300 defines the Hamming distances between all replicas, and consequently introduces interaction between replicas.

In the proposal distribution as represented by Equation (14), the transition candidates are selected with an equal probability of 1/N. Thus, the normalization constant is N (which means that the weights of the individual transition destinations are equal to 1 in common). When interaction between replicas is introduced, the weights for the respective transition candidates are different, and the normalization constant depends on the present state before the transition. The Ising machine 300 has to compute the normalization constant but, if the interaction is represented by a linear expression of the Hamming distance, may easily perform computation by difference computation (cumulative computation).

A method for computing the proposal probability in consideration of a distance between replicas will be described in detail below. First, a general system of the proposal probability is defined as follows.

A system including M replicas (M is an integer of 1 or greater) is considered. Let $x^l = (x_1^l, x_2^l, \ldots, x_N^l)$ (where $x_j^l \in \{0, 1\}$) denote state variables of a first replica. Let $d(x^l, x^k)$ denote (an increasing function of) a distance between two replicas $x^l$ and $x^k$, and energy of interaction is given as $G(x)$. The energy of interaction may be defined in several ways as represented by, for example, Equation (15) or Equation (16).

$$G(X) := \gamma \sum_{k=1(\neq l)}^{M} d(x^l, x^k) \quad (15)$$

$$G(X) := \gamma \sum_{k=1(\neq l)}^{M} \sqrt{d(x^l, x^k)} \quad (16)$$

$\gamma$ represents a real-number constant. If $\gamma$ has a positive value, it may be regarded as attractive interaction. If $\gamma$ has a negative value, it may be regarded as repulsive interaction. The proposal probability is given as $(x^l \to x^l[j_0])$ by using this $G(x)$. $x^l[j_0]$ represents the state in which the $j_0$-th bit is flipped. For example, the proposal probability may be defined as represented by Equation (17) or Equation (18).

$$g(x^l \to x^l[j_0]) := \frac{\exp(-\beta \Delta G)}{Z(x^l)} \quad (17)$$

$$g(x^l \to x^l[j_0]) := \frac{\min[1, \exp(-\beta \Delta G)]}{Z(x^l)} \quad (18)$$

$Z(x^l)$ is the normalization constant, and a computation method thereof will be described later.

In the case where a linear function of the Hamming distance is used as the distance between replicas, the distance between replicas may be defined by Equation (19).

$$d(x^l, x^k) := \sum_{j=1}^{N} (x_j^l - x_j^k)^2 = \sum_{j=1}^{N} (x_j^l + x_j^k - 2x_j^l x_j^k) \quad (19)$$

In this case, $\Delta G = G(x^l[j_0]) - G(x^l)$ and $g(x^l \to x^l[j_0])$ may be computed in a manner as follows.

$$\Delta G = \gamma(1 - 2x_{j_0}^l) \sum_{k=1(k \neq l)}^{M} (1 - 2x_{j_0}^k) \quad (20)$$

$$g(x^l \to x^l[j_0]) = \frac{1}{Z(x^l)} \exp\left(-\beta\gamma(1 - 2x_{j_0}^l) \sum_{k=1(k \neq l)}^{M} (1 - 2x_{j_0}^k)\right) \quad (21)$$

In this way, the proposal probability reflecting the interaction between the replicas may be computed. The definition of the acceptance probability will be described next.

The acceptance probability $a(x^l \to x^l[j_0])$ of the general system may be defined as follows when the Metropolis criterion is adopted.

$$a(x^l \to x^l[j_0]) = \min\left[1, \frac{g(x^l[j_0] \to x^l)}{g(x^l \to x^l[j_0])} \frac{\pi(x^l[j_0])}{\pi(x^l)}\right] \quad (22)$$

$$= \min\left[1, \frac{Z(x^l)}{Z(x^l[j_0])} \exp(\beta(2\Delta G - \Delta E))\right]$$

Then, the transition probability is represented as $W(x^l \to x^l[j_0]) = g(x^l \to x^l[j_0]) \times a(x^l \to x^l[j_0])$. Therefore, the quantities used for these computations are three quantities which are $\Delta E$, $\Delta G$, and the normalization constant $Z$.

A method for computing the normalization constant Z will be described by taking, as an example, the case where a linear function of the Hamming distance is used as the distance between replicas. Since the proposal candidate is in a state in which just one bit is flipped in the replica l, the normalization constant $Z(x^l)$ is computed as the total sum thereof using Equation (23) below.

$$Z(x^l) = \sum_{j=1}^{N} \exp(-\beta \Delta G) = \sum_{j=1}^{N} \exp(-\beta(G(x^l[j]) - G(x^l))) \quad (23)$$

When it is attempted to compute the normalization constant with Equation (23) as it is, the sum of the exponential functions is computed by the number of all spins. Thus, the computation amount becomes enormous. Accordingly, the Ising machine 300 suppresses the computation amount by performing the difference computation (cumulative computation) based on the fact that the single-bit flip is used. A difference in the normalization constant in the case where the j-th bit of the replica l alone is flipped is represented by Equation (24) below.

$$Z(x^l[j_0]) - Z(x^l) = \exp(+\beta \Delta G) - \exp(-\beta \Delta G) \quad (24)$$

The Ising machine 300 may determine the normalization constant obtained after the bit flip by adding the difference in the normalization constant determined by computing the right side of Equation (24) to the normalization constant obtained before the bit flip. When the bit flip is accepted, the Ising machine 300 stores the normalization constant at that time in a register or a memory, and uses the normalization constant in computation of the normalization constant in the next bit flip.

A method for computing $\Delta G$ will be described by taking, as an example, the case where a linear function of the Hamming distance is used as the distance between replicas. The computation of $\Delta G$ is generally difference computation in the distance between replicas (or an increasing function of the distance). In simple difference computation, the Hamming distances between replicas obtained before and after the transition are to be stored. However, if the form of the distance (or an increasing function of the distance) is specifically known, the distance may be rewritten to a quantity that is dependent on the present state as represented by Equation (25) and Equation (26) by performing the difference computation.

$$\Delta G = \gamma \sum_{k=1(k \neq l)}^{M} d(x^l[j_0], x^k) - \gamma \sum_{k=1(k \neq l)}^{M} d(x^l, x^k) \quad (25)$$

$$\frac{\Delta G}{\gamma} = M - 2d(\tilde{x}_{j_0}(l), \tilde{x}_{j_0}) - 1 \quad (26)$$

In Equation (26), $\tilde{x}_{j_0}(l)$ (tilde is attached to x) is a bit string of $x_{j_0}(l)$ (tilde is attached to x)$=(x_j^l, x_j^l, \ldots, x_j^l)$. $\tilde{x}_{j_0}$ (tilde is attached to x) is a vector of a bit string of $x_{j_0}$ (tilde is attached to x)$=(x_j^1, x_j^2, \ldots, x_j^M)$.

In the case where the distance between replicas is represented by a linear function of the Hamming distance, $\Delta G$ may be expressed just by the Hamming distance in the vector of the newly introduced bit string by using Equation (26). Therefore, it is sufficient to update the Hamming distance alone.

Although the case of single-bit flip is assumed in the description above, there may be a case where a plurality of bits may be flipped in a single state transition. For example, this corresponds to the case of solving a problem with the one-hot constraint.

The one-hot constraint is a constraint that "there is just a single variable having a value of 1 in a certain set of variables", This constraint is applied to various problems such as a quadratic assignment problem (QAP) and a vehicle routing problem (VRP).

Figure 7:
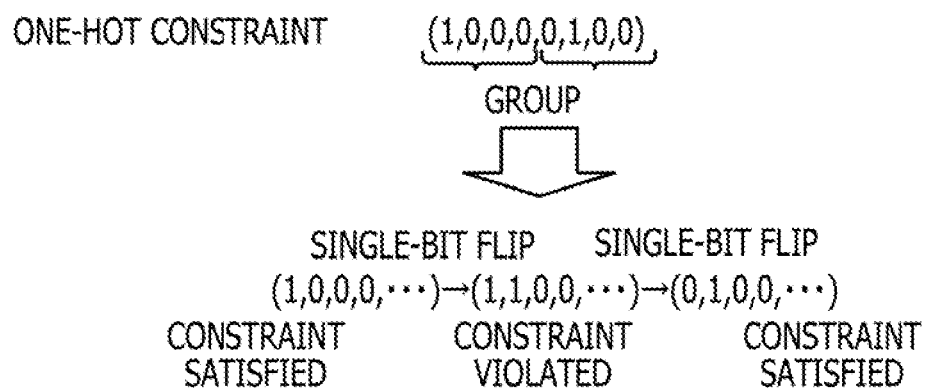
FIG. 7 illustrates an example of a single-bit flip under a one-hot constraint.

FIG. 7 illustrates an example of a single-bit flip under a one-hot constraint. In the example of FIG. 7, bits indicating the state variables of the Ising model are divided into groups of four bits each. The one-hot constraint permits just one bit to have "1" among the bits belonging to the same group. When the single-bit flip is performed under such a one-hot constraint, just one bit is inverted in a single state transition, resulting in a constraint violation state. If the single-bit flip is performed again, the constraint condition is successfully satisfied.

In the case where a problem with the one-hot constraint is solved as described above, the single-bit flip is inefficient. Accordingly, the Ising machine 300 is capable of flipping a plurality of bits in a single state transition.

Types of one-hot constraint include one-way one-hot (1W1H) and two-way one-hot (2W1H). 1W1H is a constraint that there is just bit having a value of "1" in each group when the bits are grouped in one way. The example illustrated in FIG. 7 corresponds to 1W1H. By flipping two bits in a single state transition, the state transition may be performed with the constraint being satisfied.

Figure 8:
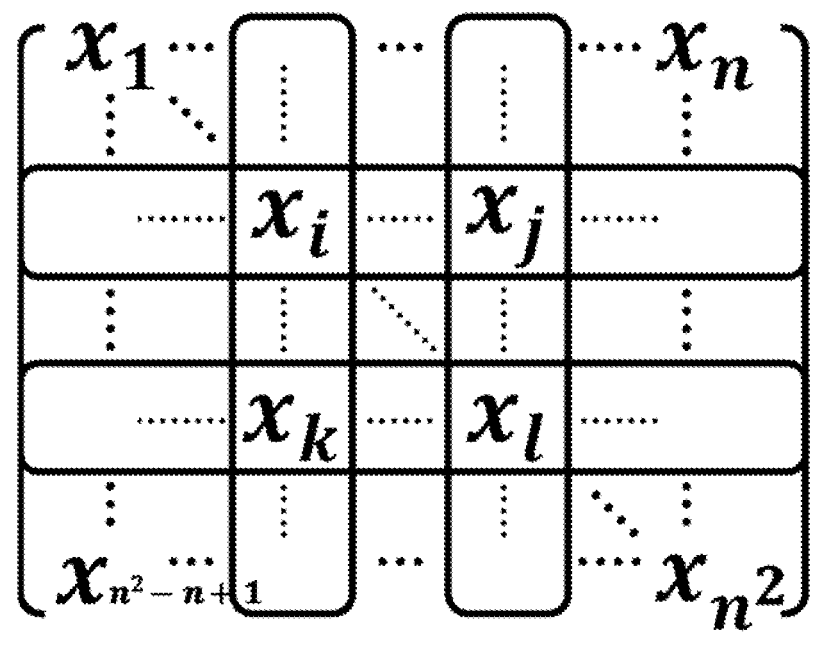

In 2W1H, bits are grouped in two ways. In this case, bits belongs to two groups generated in different ways. Even in 2W1H, there is a constraint that there is just one bit having a value of "1" in each group, FIG. 8 is a diagram describing the 2W1H constraint. In FIG. 8, N bits are elements of an n×n square matrix (where n is an integer of 1 or greater). $N=n^2$ holds. In 2W1H, there is a constraint that the sum of values of bits in each of row and in each column is "1". For example, the constraint is satisfied when just one bit among bits in the same row has a value of "1" and just one bit among bits in the same column has a value of 1. In the case where there is the constraint of 2W1H, by flipping four bits in a single state transition, the state transition may be made with the constraint being satisfied.

When $m=1, 2, \ldots, N$ is set, the state transition, the energy change value $\Delta E_i$ and an update amount $\Delta h$ of the local field in the case of a single-bit flip, in the case of two-bit flip in 1W1H, and four-bit flip of 2W1H are represented as follows.

<Single-Bit Flip>
State Transition: $x_i \rightarrow x_i + \Delta x_i$
Energy change value: $\Delta E_i = -h_i \cdot \Delta x_i$
Update amount $\Delta h$ of the local field: $\Delta h_m = W_{m,i} \cdot \Delta x_i$
<1W1H (Two-Bit Flip)>
State Transition: $x_i$: 1→0, $x_j$: 0→1
Energy change value: $\Delta E_j = h_i - h_j$
Update amount $\Delta h$ of the local field: $\Delta h_m = -W_{m,i} + W_{m,j}$
<2W1H (Four-Bit Flip)>
State Transition: $x_i$: 1→0, $x_j$: 0→1, $x_k$: 0→1, $x_l$: 1→0
Energy change value: $\Delta E_j = (h_i + h_l) - (h_j + h_k) - (W_{il} + W_{jk})$
Update amount $\Delta h$ of the local field: $\Delta h_m = W_{mj} + W_{mk} - (W_{m,i} + W_{m,l})$ The constraint to be applied is designated by a user, for example, when the user gives an instruction for solving the problem. The Ising machine 300 computes ΔE according to the designated constraint, and inverts one or a plurality of bits with a transition probability according to the distance between replicas.

Solution search functionality of the Ising machine 300 that takes distances between replicas into consideration will be described next.

Figure 9:
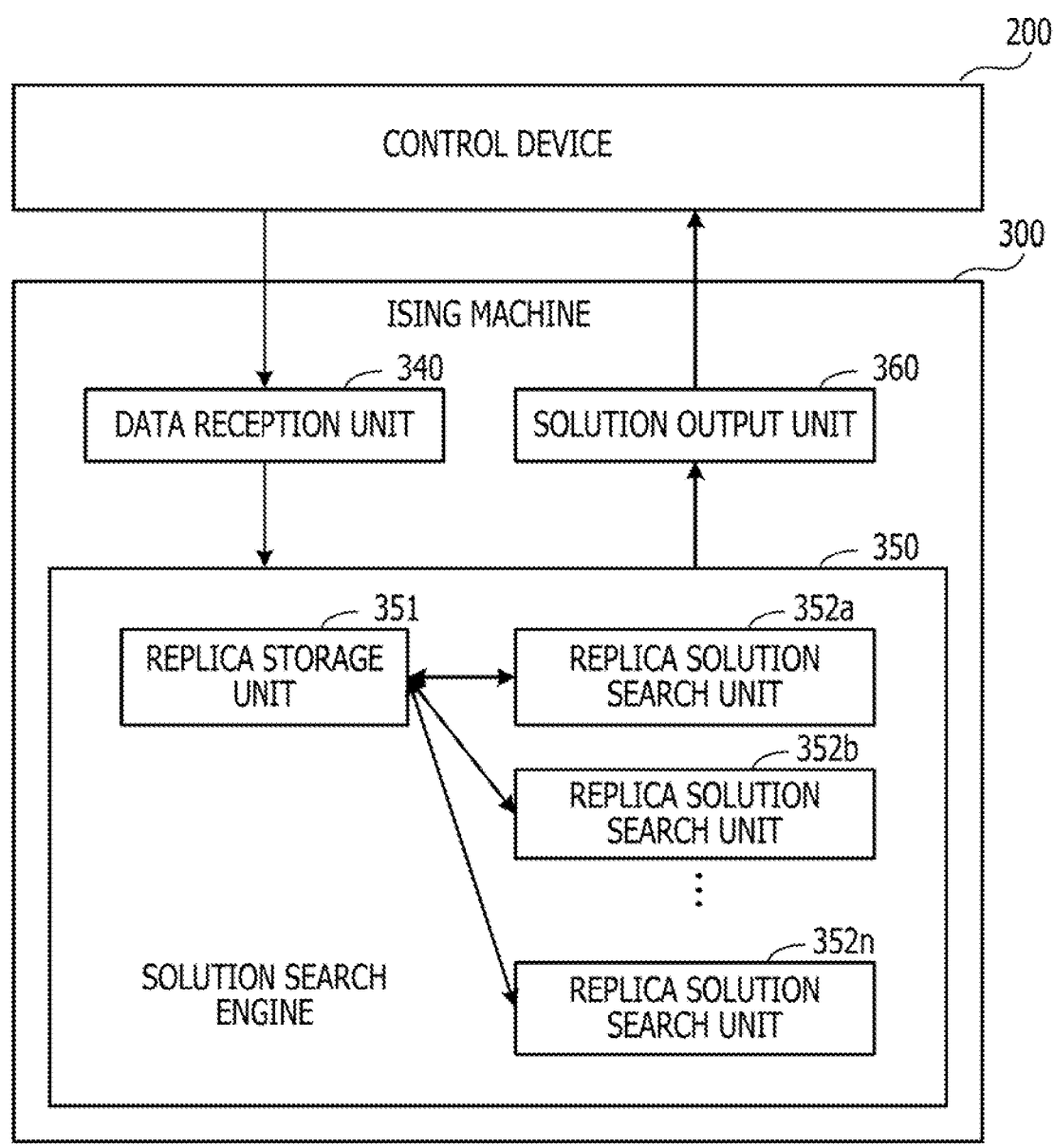
FIG. 9 illustrates an example of solution search functionality of the Ising machine.

FIG. 9 illustrates an example of solution search functionality of the Ising machine. The Ising machine 300 includes a data reception unit 340, a solution search engine 350, and a solution output unit 360. The data reception unit 340 and the solution output unit 360 are functions implemented by the control circuit 320 illustrated in FIG. 4. The solution search engine 350 is a function implemented by the control circuit 320 illustrated in FIG. 4 controlling the neuron circuits 311, 312, ..., 31n and the memory 330.

The data reception unit 340 receives, from the control device 200, information used in solving the problem subjected to the search. For example, the data reception unit 340 acquires parameters such as the temperature, the number of replicas, the magnitudes of interaction between the replicas, the number of iterations (the number of repetitions of the state transition), and the initial state. The data reception unit 340 also acquires data such as a weight matrix (a factor of a quadratic expression) having, as elements, weight factors of the Ising model that represents the problem to be solved, a bias matrix (a factor of a linear expression), a constant term, and group information of the one-hot constraint. The data reception unit 340 transmits the received information to the solution search engine 350.

The solution search engine 350 searches for a solution with the minimum energy by using the plurality of replicas. To this end, the solution search engine 350 includes a replica storage unit 351 and a plurality of replica solution search units 352a, 352b, ..., 352n. The replica storage unit 351 is implemented using, for example, the memory 330 illustrated in FIG. 4. Each of the plurality of replica solution search units 352a, 352b, ..., 352n is implemented by using neuron circuits for respective bits included in the Ising model.

The replica storage unit 351 stores the states of the replicas. For example, the replicas are sequentially updated. The states of the replicas set before the update are used in computation of the interaction between the replicas. Thus, the replica storage unit 351 stores the states of the replicas set before the update. The states of the replicas are represented by values of the bits corresponding to the respective state variables and values of parameters such as the temperature parameter.

Each of the replica solution search units 352a, 352b, ..., 352n performs a solution search using a replica. For example, the individual replica solution search units 352a, 352b, ..., 352n compute interaction between replicas while exchanging information indicating the states of the replicas with each other via the replica storage unit 351, and search for a solution.

Figure 10:
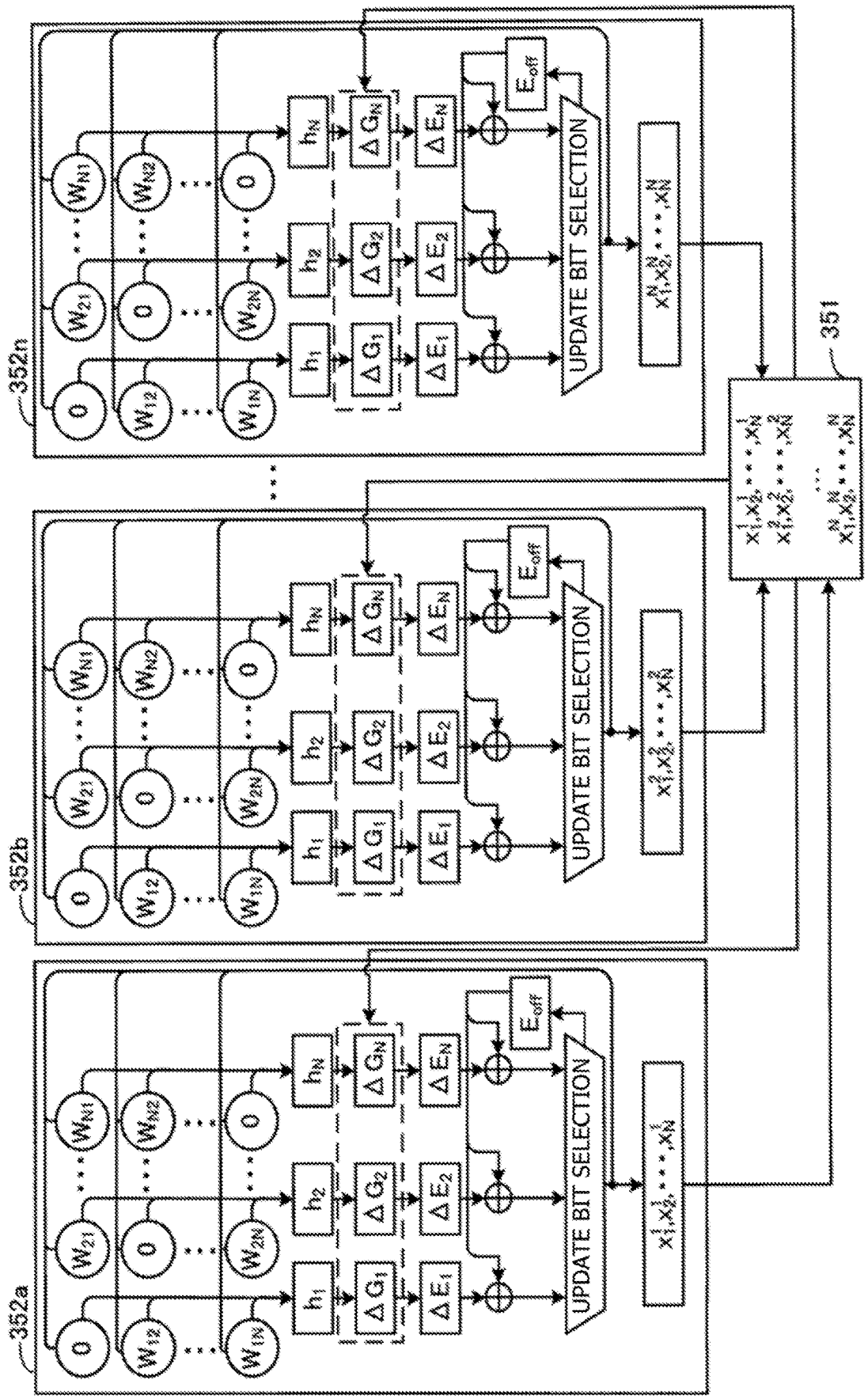
FIG. 10 illustrates an example of a process performed in a solution search engine.

FIG. 10 illustrates an example of a process performed in the solution search engine. For example, the replica solution search unit 352a stores weight factors ($W_{ij}$). The replica solution search unit 352a computes, using the weight factors ($W_{ij}$) and the present values ($x_1^1, x_2^1, \ldots, x_N^1$) of the respective bits, the local fields ($h_1, h_2, \ldots, h_N$) based on Equation (4). Based on Equation (26), the replica solution search unit 352a then computes differences ($\Delta G_1, \Delta G_2, \ldots, \Delta G_N$) in energy of interaction between the replicas if each of the bits is flipped. At this time, the replica solution search unit 352a acquires information (values of respective bits) indicating the state of the other replica from the replica storage unit 351, computes the distance to the other replica, and computes the difference in energy of interaction between the replicas by using the computation result.

The replica solution search unit 352a computes energy change values ($E_1, E_2, \ldots, E_N$) by using the values of the local fields ($h_1, h_2, \ldots, h_N$). The computation expression for the energy change value differs depending on the case of a single-bit flip, the case of 1W1H, or the case of 2W1H. For example, in the case of a single-bit flip, the energy change value is "$\Delta E_i = -h_i \cdot \Delta x_i$". In the case of 1W1H (two-bit flip), the energy change value is "$\Delta E_j = h_i - h_j$". In the case of 2W1H (four-bit flip), the energy change value is $\Delta E_j = (h_i + h_l) - (h_j + h_k) - (W_{il} + W_{jk})$.

The replica solution search unit 352a subtracts a positive offset value $E_{off}$ from the energy change value ΔE. A predetermined value is added to the offset value $E_{off}$ when a bit to be flipped is not selected. The increase in the offset value $E_{off}$ is repeated until a bit to be flipped is selected. By increasing the offset value $E_{off}$ in this manner, the time for which the energy of the replica stays at the local minimum is reduced. The initial value of the offset value $E_{off}$ is, for example, "0".

The replica solution search unit 352a selects a bit to be flipped (update bit) based on the energy change value ΔE obtained if each bit is flipped (a value obtained by subtracting the offset value $E_{off}$ when the offset value $E_{off}$ is not "0"). There are various methods for selecting an update bit (see FIGS. 14 to 17). Depending on a method of selecting an update bit, acceptance of update of any bit may be rejected in selection of an update bit, and no update bit may be selected. For example, if no update bit may be selected, the replica solution search unit 352a increases the offset value $E_{off}$ and performs selection of an update bit again.

If the update bit is successfully selected, the replica solution search unit 352a flips the value of the update bit, and generates the updated state of the replica "$x_1^1, x_2^1, \ldots, x_N^1$".

The replica solution search units 352b, ..., 252n other than the replica solution search unit 352a also generate the updated states of the respective replicas similarly to the replica solution search unit 352a.

The states "$x_1^1, x_2^1, \ldots, x_N^1$", "$x_1^2, x_2^2, \ldots, x_N^2$", ..., "$x_1^N, x_2^N, \ldots, x_N^N$" of the replicas respectively generated by the replica solution search units 352a, 352b, ..., 352n are held in the replica storage unit 351. Each of the replica solution search units 352a, 352b, ..., 352n may compute a difference in energy of interaction between the replicas at the next state update timing by referring to the replica storage unit 351.

A solution search procedure performed by the solution search engine 350 will be described in detail below.

Figure 11:
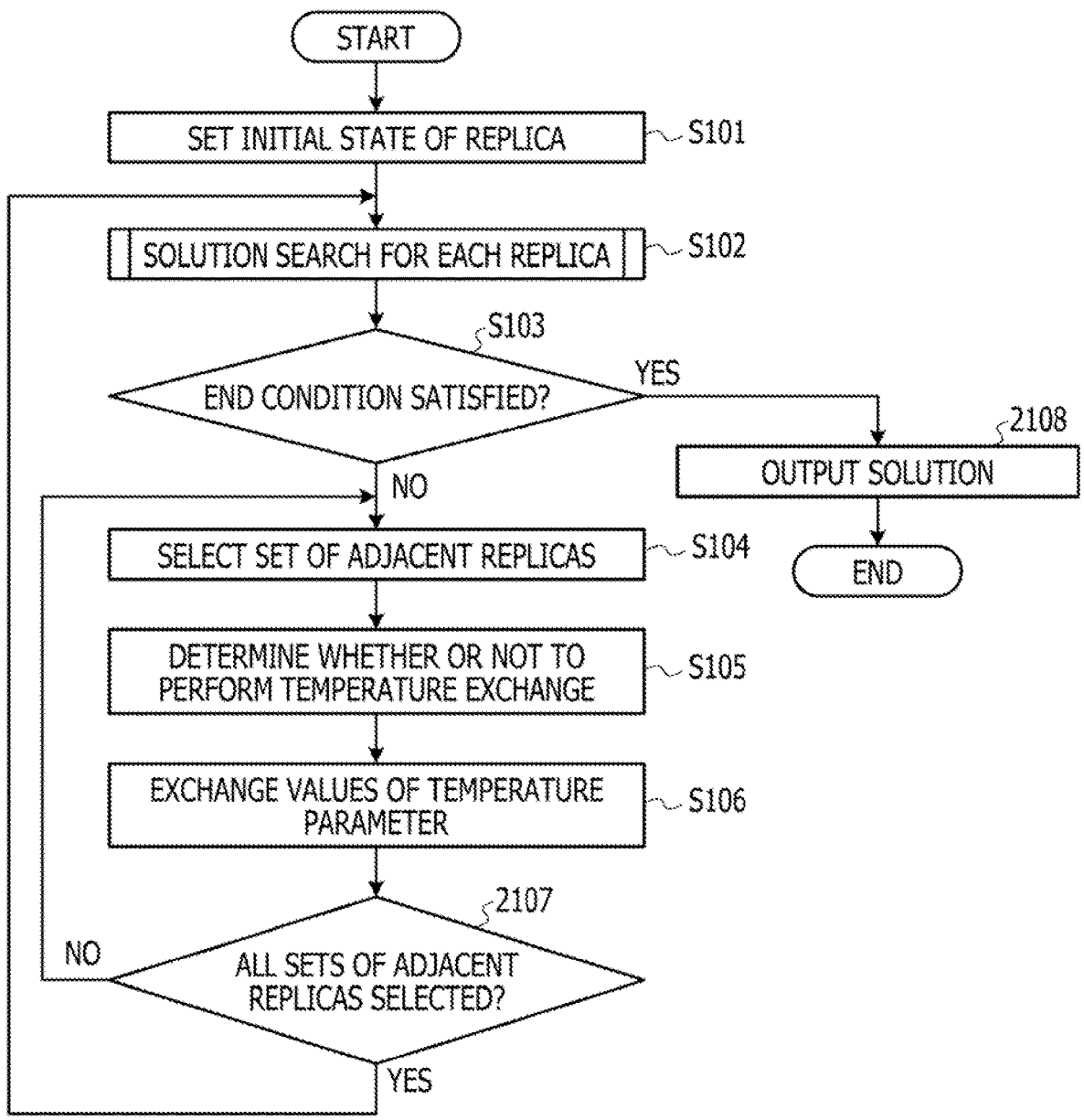
FIG. 11 is a flowchart illustrating an example of a procedure of a solution search process.

FIG. 11 is a flowchart illustrating an example of a procedure of the solution search process. The process illustrated in FIG. 11 will be described below in accordance with step numerals.

[Step S101] The solution search engine 350 sets initial states (values of the respective bits, values of the temperature parameter, and the like) of the plurality of replicas in the replica solution search units 352a, 352b, . . . , 352n to which the respective replicas are allocated. Each of the replica solution search units 352a, 352b, . . . , 352n computes initial energy, an initial distance between replicas, an initial normalization constant, and the like based on the initial state of the replica allocated thereto.

[Step S102] The solution search engine 350 causes the replica solution search units 352a, 352b, . . . , 352n to perform solution searches for the respective replicas. Details of the solution search process for each replica will be described later (see FIG. 12).

[Step S103] The solution search engine 350 determines whether or not a solution search end condition is satisfied. For example, the solution search engine 350 determines that the end condition is satisfied when the number of times the processing in step S102 is repeated reaches a predetermined number of times. If the end condition is satisfied, the solution search engine 350 causes the process to proceed to step S108. If the end condition is not satisfied, the solution search engine 350 causes the process to proceed to step S104.

[Step S104] The solution search engine 350 selects a set of replicas that are adjacent to each other when the plurality of replicas are arranged by the value of the temperature parameter.

[Step S105] The solution search engine 350 determines whether or not to perform temperature exchange in the selected set of replicas. For example, the solution search engine 350 determines the exchange probability using the Metropolis-Hastings criterion based on the energy difference between the replicas and the value of the temperature parameter of each of the replicas. The solution search engine 350 determines to perform the temperature exchange when the exchange probability is equal to 1. If the exchange probability is less than 1, the solution search engine 350 generates a random number ranging, for example, from 0 and 1. If the value of the random number is less than or equal to the exchange probability, the solution search engine 350 determines to perform the temperature exchange.

[Step S106] If determining to perform the temperature exchange, the solution search engine 350 exchanges the values of the temperature parameter of the respective replicas of the selected set.

[Step S107] The solution search engine 350 determines whether or not all sets of adjacent replicas have been selected. If there is a set yet to be selected, the solution search engine 350 causes the process to proceed to step S104. If all the sets have been selected, the solution search engine 350 causes the process to proceed to step S102.

[Step S108] The solution search engine 350 outputs, as a solution, the state of the replica with the minimum energy.

In this way, an efficient solution search using a plurality of replicas is performed while performing replica exchange.

The solution search process for each replica will be described in detail next.

Figure 12:
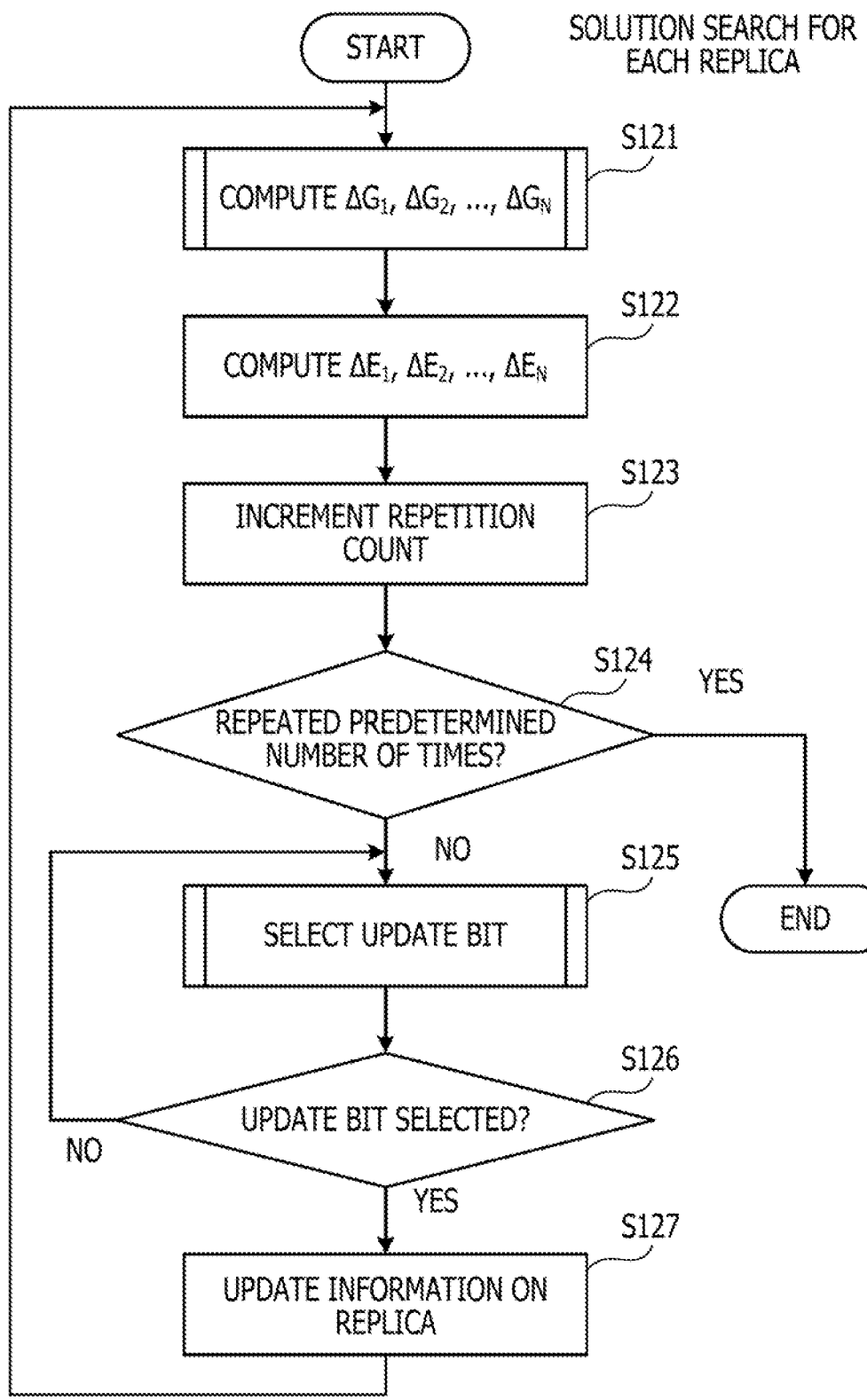
FIG. 12 is a flowchart illustrating an example of a procedure of a solution search process for each replica.

FIG. 12 is a flowchart illustrating an example of a procedure of the solution search process for each replica. The process illustrated in FIG. 12 will be described below in accordance with step numerals.

[Step S121] Each of the replica solution search units 352a, 352b, . . . , 352n in the solution search engine 350 computes a difference in energy of interaction between replicas ($\Delta G_1$, $\Delta G_2$, . . . , $\Delta G_N$) for the replica allocated thereto. Details of the processing of computing the difference in energy of interaction between replicas will be described later (see FIG. 13).

[Step S122] Each of the replica solution search units 352a, 352b, . . . , 352n computes the energy change value ($\Delta E_1$, $\Delta E_2$, . . . , $\Delta E_N$) for the replica allocated thereto.

[Step S123] Each of the replica solution search units 352a, 352b, . . . , 352n increments the repetition count.

[Step S124] Each of the replica solution search units 352a, 352b, . . . , 352n determines whether or not the processing has been repeated a predetermined number of times. If the processing has been repeated the predetermined number of times, each of the replica solution search units 352a, 352b, . . . , 352n ends the solution search process for each replica. If the repetition count does not reach the predetermined number of times, each of the replica solution search units 352a, 352b, . . . , 352n causes the process to proceed to step S125.

[Step S125] Each of the replica solution search units 352a, 352b, . . . , 352n performs the update bit selection process. Details of the update bit selection process will be described later (see FIGS. 14 to 17).

[Step S126] Each of the replica solution search units 352a, 352b, . . . , 352n determines whether or not the update bit is selected. If the update bit is not selected, each of the replica solution search units 352a, 352b, . . . , 352n causes the process to proceed to step S125. If the update bit is selected, each of the replica solution search units 352a, 352b, . . . , 352n causes the process to proceed to step S127.

[Step S127] Each of the replica solution search units 352a, 352b, . . . , 352n updates information on the replica. For example, each of the replica solution search units 352a, 352b, . . . , 352n flips the state of the selected bit, and updates the local field h of each bit, the energy E of the replica, the distance d between the replica and the other replica, and the normalization constant Z. Each of the replica solution search units 352a, 352b, . . . , 352n then causes the process to proceed to step S121.

The processing of computing the difference ($\Delta G_1$, $\Delta G_2$, . . . , $\Delta G_N$) in energy of interaction between replicas will be described in detail.

Figure 13:
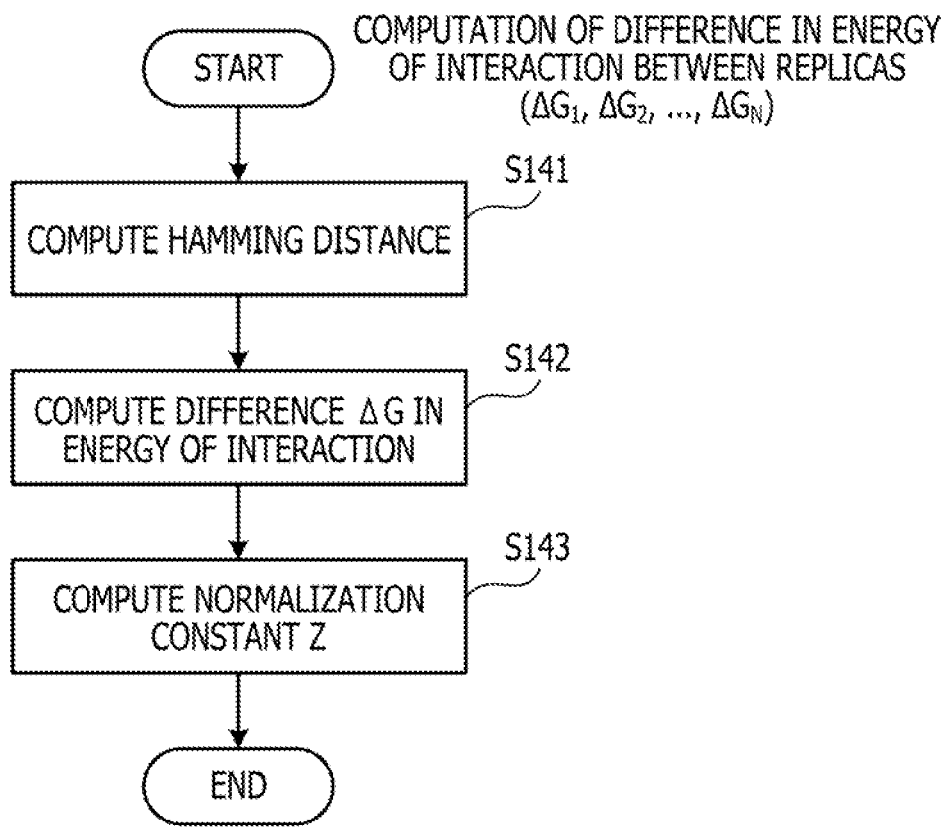
FIG. 13 is a flowchart illustrating an example of a procedure of computing a difference in energy of interaction between replicas.

FIG. 13 is a flowchart illustrating an example of the procedure of computing a difference in energy of interaction between replicas. The process illustrated in FIG. 13 will be described below in accordance with step numerals.

[Step S141] Each of the replica solution search units 352a, 352b, . . . , 352n computes the Hamming distance between the replica allocated thereto and each of the replicas other than the replica allocated thereto.

[Step S142] Each of the replica solution search units 352a, 352b, . . . , 352n computes, for each bit of the replica allocated thereto, a difference ($\Delta G_1$, $\Delta G_2$, . . . , $\Delta G_N$) in energy of interaction between replicas before and after the transition if the bit is flipped. For example, a difference in energy of interaction between replicas obtained if the first bit is flipped is $\Delta G_1$.

[Step S143] Each of the replica solution search units 352a, 352b, . . . , 352n computes the normalization constant Z of the replica allocated thereto. For example, in the case where the distance between replicas is represented by a linear expression of the Hamming distance, each of the replica solution search units 352a, 352b, ..., 352n may compute the difference in the normalization constant before and after the state transition. When the difference is computed, each of the replica solution search units 352a, 352b, ..., 352n may obtain the latest normalization constant by accumulating the differences in the normalization constant for respective state transitions.

A method of selecting the update bit will be described next. As the method of selecting the update bit, for example, three methods below are conceived.

The first update bit selection method is a method based on the original Boltzmann. The second update bit selection method is a method of efficiently performing updating of a bit by performing parallel computation of energy and referring to a direction in which energy decreases first. The third update bit selection method is a rejection-free method in which bit flip occurs in one iteration all the time.

Figure 14:
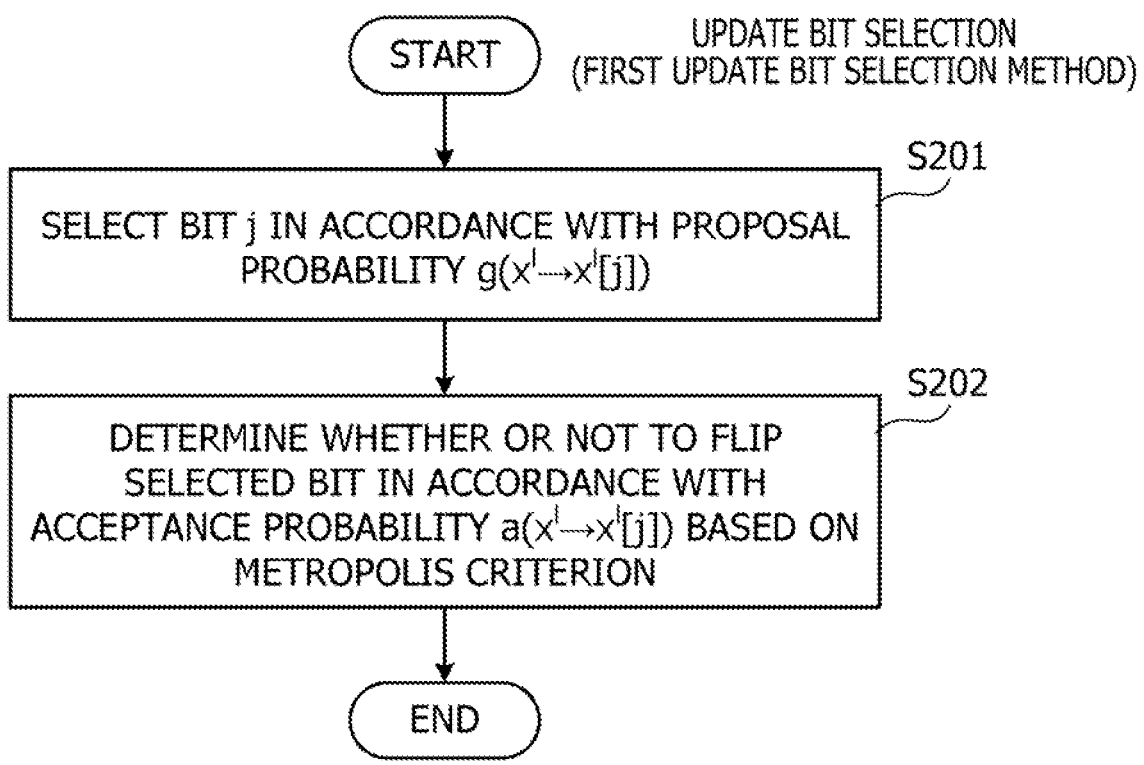
FIG. 14 is a flowchart illustrating an example of a procedure of an update bit selection process based on a first update bit selection method.

FIG. 14 is a flowchart illustrating an example of a procedure of the update bit selection process based on the first update bit selection method. The process illustrated in FIG. 14 will be described below in accordance with step numerals.

[Step S201] Each of the replica solution search units 352a, 352b, ..., 352n selects a bit j in accordance with the proposal probability $g(x^l \to x^l[j])$ in which the distance between replicas is taken into consideration.

[Step S202] Each of the replica solution search units 352a, 352b, ..., 352n determines whether or not to flip the selected bit in accordance with the acceptance probability $a(x^l \to x^l[j])$ based on the Metropolis criterion.

The first update bit selection method is a simple method and computation is simple. However, the proposal to flip the selected bit may be rejected. If the proposal is rejected, each of the replica solution search units 352a, 352b, ..., 352n determines "NO" in step S126 in FIG. 12, and repeats the update bit selection process.

In the first update bit selection method, the acceptance probability decreases due to an influence of the bias of the proposal distribution, and consequently rejection may occur all the times. Accordingly, when the proposal of the update bit is rejected, each of the replica solution search units 352a, 352b, ..., 352n increases the offset value $E_{off}$. Consequently, a probability of the update bit being selected in the next update bit selection process may be increased. For example, each of the replica solution search units 352a, 352b, ..., 352n adds a predetermined value to the offset value $E_{off}$ when there is no direction in which the energy decreases (the energy difference becomes positive for any bit update).

Each of the replica solution search units 352a, 352b, ..., 352n may also use the second update bit selection method of efficiently performing bit update by performing parallel computation of energy and referring to a direction in which energy decreases first.

Figure 15:
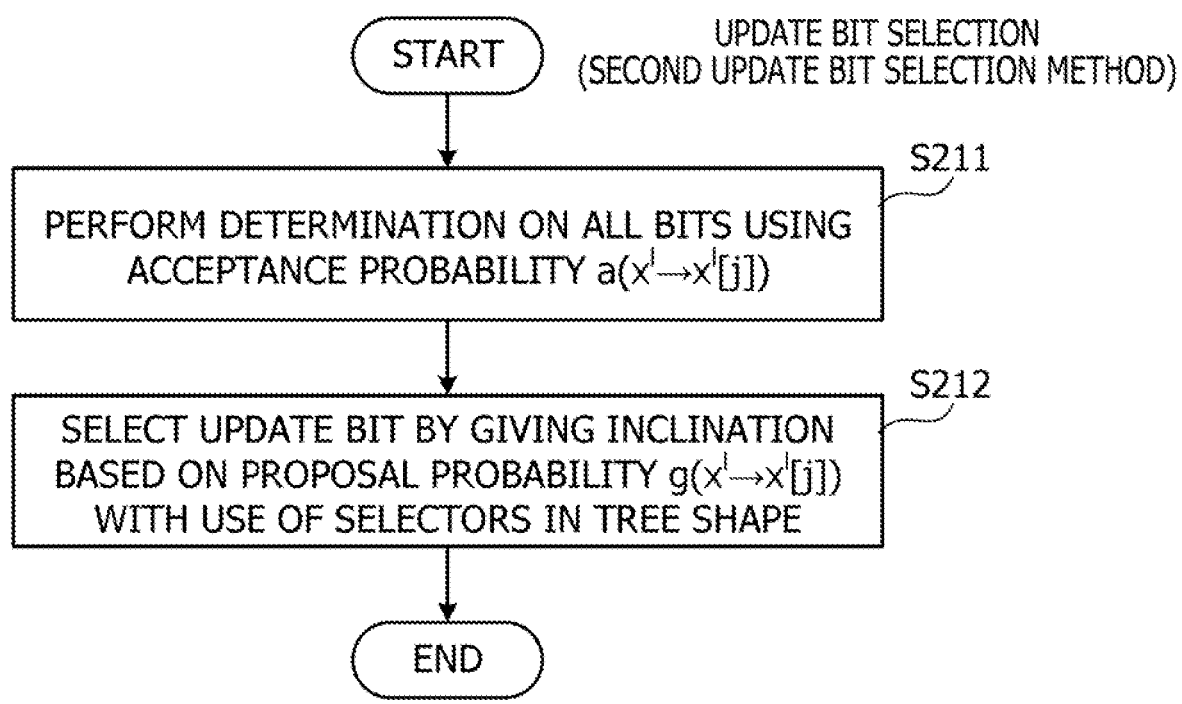
FIG. 15 is a flowchart illustrating an example of a processing procedure of a second update bit selection method.

FIG. 15 is a flowchart illustrating an example of a processing procedure of the second update bit selection method. The process illustrated in FIG. 15 will be described below in accordance with step numerals.

[Step S211] Each of the replica solution search units 352a, 352b, ..., 352n determines, for every bit, whether or not to flip the bit if the bit selected, in accordance with the acceptance probability $a(x^l \to x^l[j])$ based on the Metropolis criterion. Each of the replica solution search units 352a, 352b, ..., 352n sets a flag indicating a determination result in association with each bit.

[Step S212] Each of the replica solution search units 352a, 352b, ..., 352n refers to the flag of each bit, selects by using selectors coupled in a tree shape, the update bit by giving an inclination in consideration of the distance between replicas.

Figure 16:
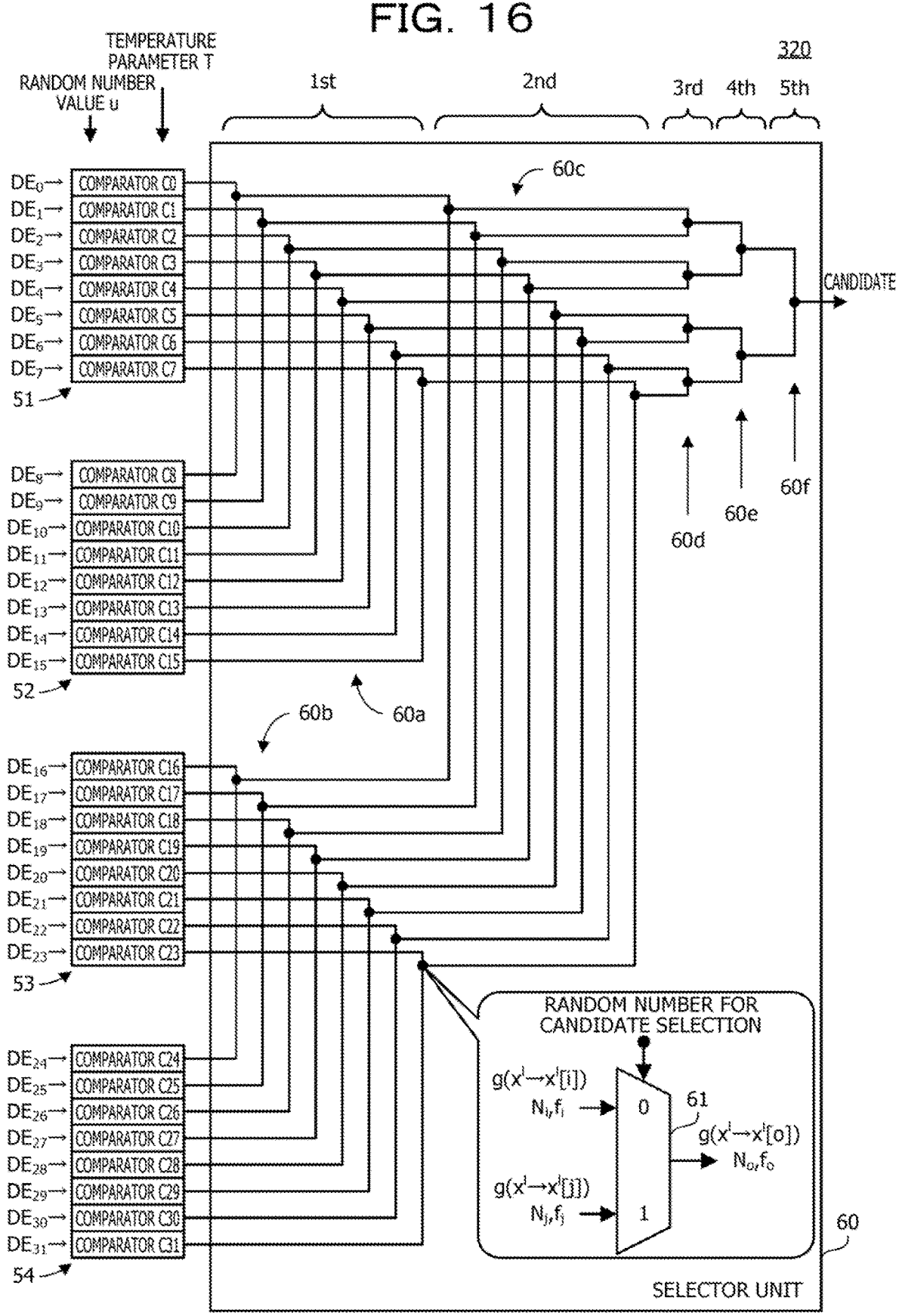
FIG. 16 illustrates an example of selectors, coupled in a tree shape, for selecting an update bit.

FIG. 16 illustrates an example of the selectors, coupled in a tree shape, for selecting the update bit. For each replica, the control circuit 320 determines whether or not to accept a state transition of each of a plurality of bits with the acceptance probability represented by Equations (6) or (7) above in accordance with the energy change value $\{\Delta Ei\}$ of the state transition. The control circuit 320 selects, using the selectors coupled in the tree shape, one of the bits whose state transition is determined to be accepted. The control circuit 320 outputs the number assigned to the selected bit and transition propriety F.

In this manner, the control circuit 320 may increase the probability of the update bit being selected by performing a parallel search for the plurality of bits.

To perform the parallel search, the control circuit 320 has a following circuit configuration. As an example, description will be given of the case where the number of bits is 32. It is assumed in the example of FIG. 16 that just one bit is selected as the update bit.

The control circuit 320 includes comparison circuit units 51 to 54 and a selector unit 60.

The comparison circuit units 51 to 54 receive the energy change values $\{\Delta Ei\}$ obtained if each of the plurality of state variables makes a transition, from the neuron circuits 311, 312, ..., and 31n, respectively. The comparison circuit units 51 to 54 each determine whether or not to accept each state transition based on $\{\Delta Ei\}$, and output transition propriety $\{fi\}$, Each of the comparison circuit units 51 to 54 includes eight (=32/4) comparators. The number of all the comparators included in the comparison circuit units 51 to 54 is 32.

For example, the comparison circuit unit 51 includes comparators C0, C1, ..., C7. The comparison circuit unit 52 includes comparators C8, C9, ..., C15. The comparison circuit unit 53 includes comparators C16, C17, ..., C23. The comparison circuit unit 54 includes comparators C24, C25, ..., C31. A comparator Ci (in the example illustrated in FIG. 16, i is an integer greater than or equal to 0 and less than or equal to 31) accepts $\Delta Ei$ and outputs an acceptance propriety fi in accordance with determination based on $\Delta Ei$. In the determination performed by the comparator Ci, the acceptance probability that is computed using the energy change value $\Delta Ei$ and the value of the temperature parameter T is compared with a random number value u ($0 \le u \le 1$). For example, the comparator Ci determines to accept the flip of the i-th bit if the random number value u is less than or equal to the acceptance probability.

The comparison circuit units 51 to 54 may compute a value represented by "T×log(u)" in advance. This value is a value that stochastically causes a state transition involving an energy increase, and may also be referred to as thermal excitation energy or thermal noise. The comparator Ci compares $\Delta Ei$ with the thermal excitation energy, and determines to accept the flip of the i-th bit, for example, if the thermal excitation energy is larger than $\Delta Ei$.

The output value of the comparator Ci is input to the selector unit 60 as a state transition candidate. The selector unit 60 then selects and outputs any one of the plurality of state transition candidates. The selector unit 60 includes n stages (n is an integer of 2 or greater) of selector trees for performing the selection. In the example of FIG. 16, n=5 holds.

The first stage (1st) of the selector tree includes partial selector units 60a and 60b. The second stage (2nd) of the selector tree includes a partial selector unit 60c. The third stage (3rd) of the selector tree includes a partial selector unit 60d. The fourth stage (4th) of the selector tree includes a partial selector unit 60e. The fifth stage (5th) of the selector tree includes a partial selector unit 60f.

Each of the partial selector units 60a, 60b, . . . , 60f includes, for example, one or a plurality of selectors that select and output one of two inputs in accordance with a random number for selection. A selector 61 is one of the plurality of selectors, and the other selectors have substantially the same configuration as the selector 61. The two inputs to the selector 61 are a set of an identification value Ni for identifying the transition number i, transition propriety information fi, and a proposal probability $g(x^l \to x^l[i])$ and a set of an identification value Nj for identifying the transition number j, transition propriety information fj, and a proposal probability $g(x^l \to x^l[j])$. The output of the selector 61 is propriety information fo obtained as the logical sum of the transition propriety information fi and the transition propriety information fj, an identification value No for identifying the transition number selected from i and j, and the proposal probability $g(x^l \to x^l[o])$ of the selected bit.

If one of the transition propriety information fi and the transition propriety information fj is 1 (acceptable) and the other is 0 (unacceptable), the selector 61 selects the bit set as acceptable. If both the transition propriety information fi and the transition propriety information fj are 0, the selector 61 may select the bit in any manner.

If both the transition propriety information fi and the transition propriety information fj are 1, the selector 61 selects, using a random number for candidate selection, one of the bits with a probability corresponding to the proposal probability. For example, the selector 61 divides a value range from 0 to 1 into two sections corresponding to bits i and j in accordance with a ratio between the proposal probabilities $g(x^l \to x^l[i])$ and $g(x^l \to x^l[j])$. The selector 61 selects a bit corresponding to the section including the random number for candidate selection. The selector 61 generates and outputs the identification value No of the bit selected based on the selection result.

In the example of FIG. 16, selectors other than the selector 61 are simplified. In FIG. 16, a portion marked with a black dot corresponds to one selector. Each of the partial selector units 60a, 60b, and 60c includes eight selectors. The partial selector unit 60d includes four selectors. The partial selector unit 60e includes two selectors. The partial selector unit 60f includes one selector. Each selector in the partial selector units 60a to 60f performs substantially the same selection processing as that of the selector 61, so that a possibility that a bit having a higher proposal probability according to the distance between replicas is selected is increased and one bit is output as a state transition candidate.

As illustrated in FIG. 16, the control circuit 320 performs a parallel search for the state transition, and narrows down the state transition candidates to one in a knockdown manner (or also referred to as a tournament manner) using the binary tree structure of the selectors. The bit for which energy decreases in response to flipping is determined to be acceptable by the comparator. Thus, if there is at least one bit for which energy decreases in response to flipping, the update bit is successfully selected by the selector unit 60 in a single selection. Even if a local solution is reached and energy increases in response to flipping of any bits, flipping of any one of the bits may be accepted based on the random number value u and the value of the temperature parameter T. If flipping of any one of the bits is accepted, the update bit is successfully selected by the selector unit 60 in a single selection. Since the proposal probabilities reflecting the distances between replicas are used in selection performed by the selectors, a possibility of a bit with a higher proposal probability being selected as the update bit increases.

If the transition propriety information output by the selector unit 60 is 0 (unacceptable), each of the replica solution search units 352a, 352b, . . . , 352n increases the offset value and repeats the update bit selection process. This increases the possibility that the update bit may be selected at an early stage.

Figure 17:
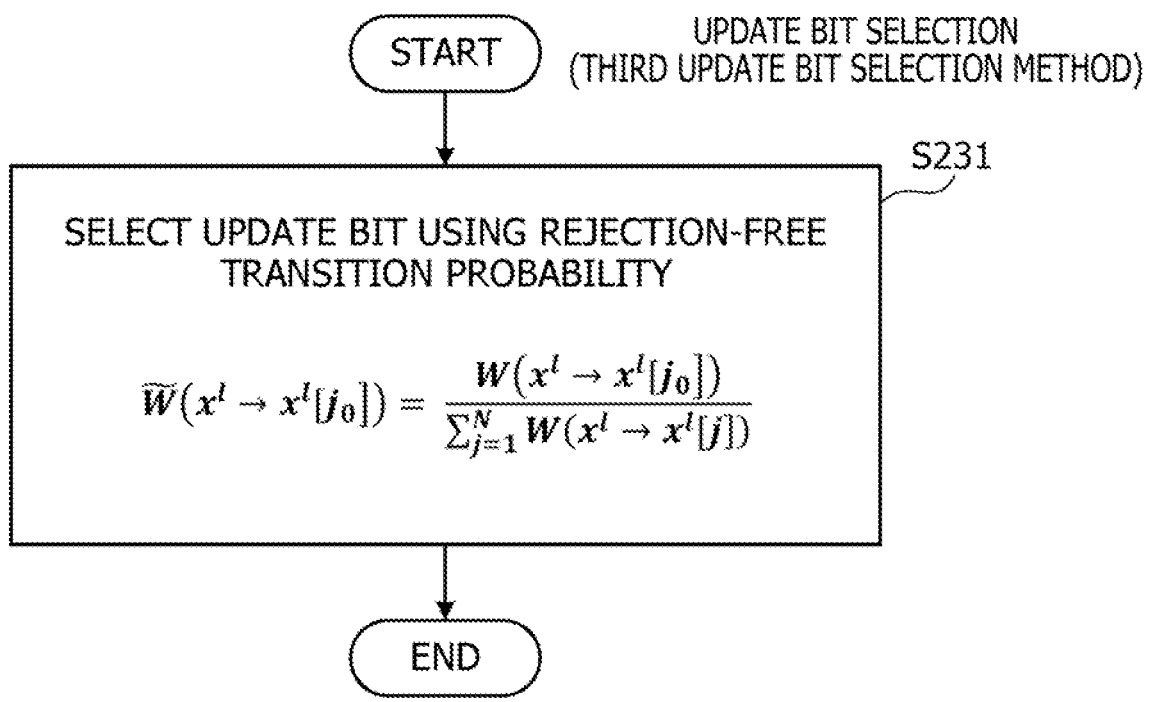
FIG. 17 is a flowchart illustrating an example of a processing procedure of a third update bit selection method.

FIG. 17 is a flowchart illustrating an example of a processing procedure of the third update bit selection method. In the third update bit selection method, the update bit may be selected a single step below.

[Step S231] Each of the replica solution search units 352a, 352b, . . . , 352n computes a rejection-free transition probability $W(x^l \to x^l[j_0])$ (tilde is attached to W) represented by Equation (27) below, by using the transition probability $W(x^l \to x^l[j_0]) = g(x^l \to x^l[j_0]) \times a(x^l \to x^l[j_0])$ of each bit.

$$\tilde{W}(x^l \to x^l[j_0]) = \frac{W(x^l \to x^l[j_0])}{\sum_{j=1}^{N} W(x^l \to x^l[j])} \quad (27)$$

Each of the replica solution search units 352a, 352b, . . . , 352n then selects any one of bits as the update bit in accordance with the rejection-free transition probability. By normalizing the transition probability of each bit and setting the total acceptance probability to be 1 in this manner, the update bit is successfully selected through a single update bit selection process all the time.

As described above, the Ising machine 300 according to the second embodiment reflects interaction between replicas on a proposal probability, and performs a solution search using a plurality of replicas. Thus, when a combinatorial optimization problem is solved based on the Metropolis-Hastings method, it is expected that each replica discretely searches a state space while maintaining a distribution of convergence destinations. Consequently, the solving performance improves. For example, a possibility of reaching the optimal solution increases, and the decrease in energy may be speeded up.

Figure 18:
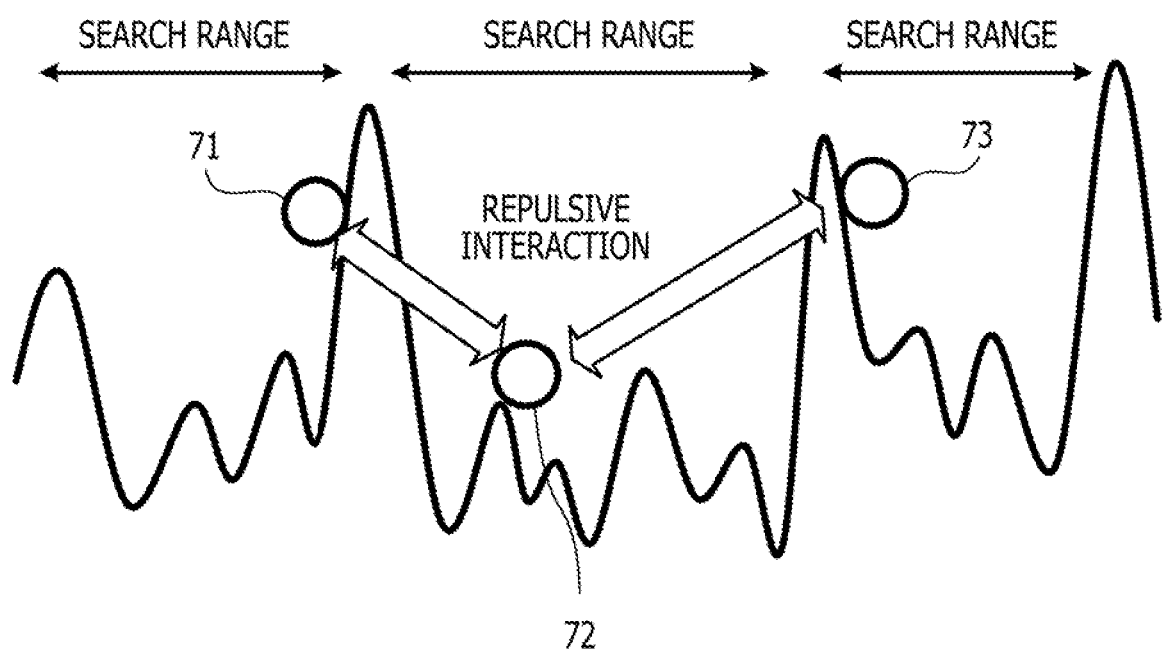
FIG. 18 illustrates an energy landscape in the case where repulsive interaction is set between replicas.

FIG. 18 illustrates an energy landscape in the case where repulsive interaction is set between replicas. Repulsive interaction is provided between a plurality of replicas 71 to 73. In this case, the replicas 71 to 73 repel each other. Consequently, a wide search space may be efficiently searched. For example, in the example of FIG. 18, the plurality of replicas 71 to 73 search different search ranges. Such a plurality of search ranges are separately searched by the plurality of replicas 71 to 73. This enables a wide range to be efficiently searched.

Figure 19:
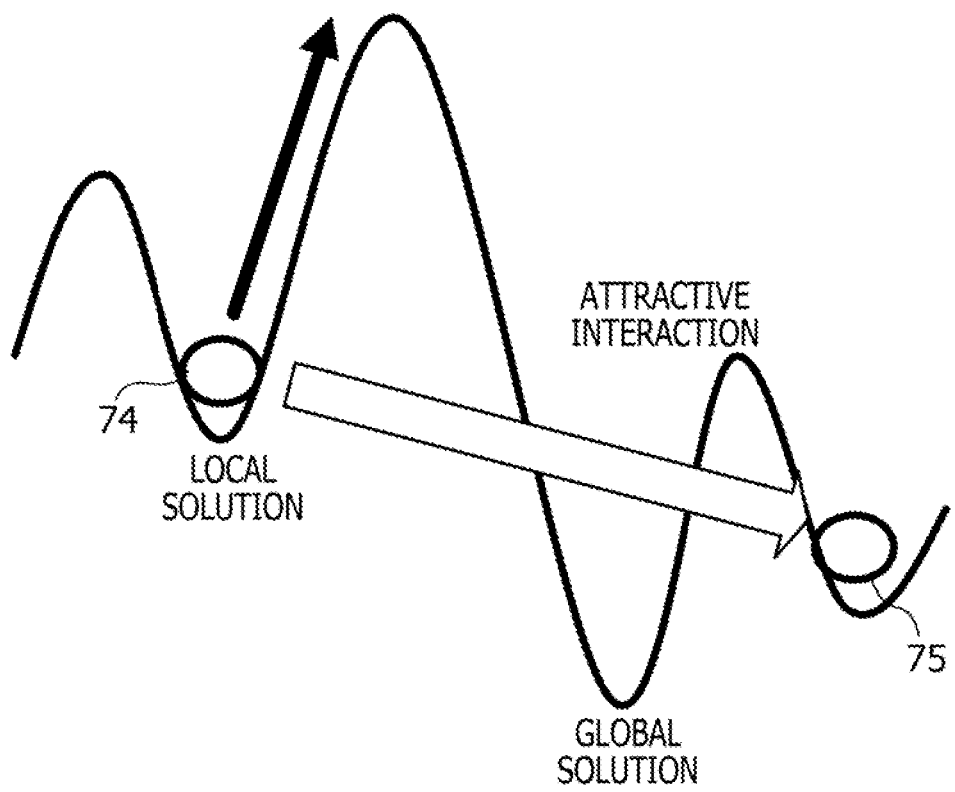
FIG. 19 illustrates an energy landscape in the case where attractive interaction is set between replicas.

FIG. 19 illustrates an energy landscape in the case where attractive interaction is set between replicas. Attractive interaction is provided between a plurality of replicas 74 and 75. The replicas 74 and 75 are attracted to each other, so that they are likely to escape from the local solution. This consequently increases the possibility of reaching the global solution as the entire population.

Figure 20:
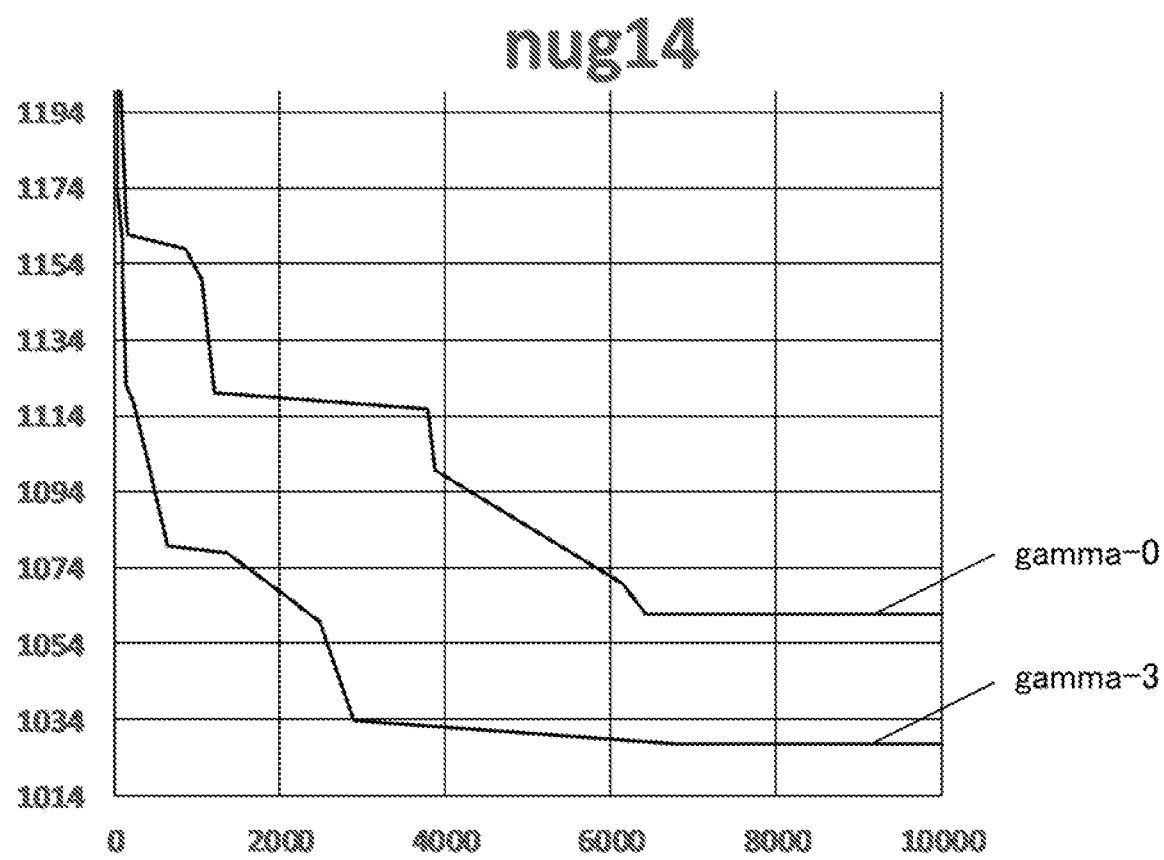
FIG. 20 illustrates a first verification example.
Figure 21:
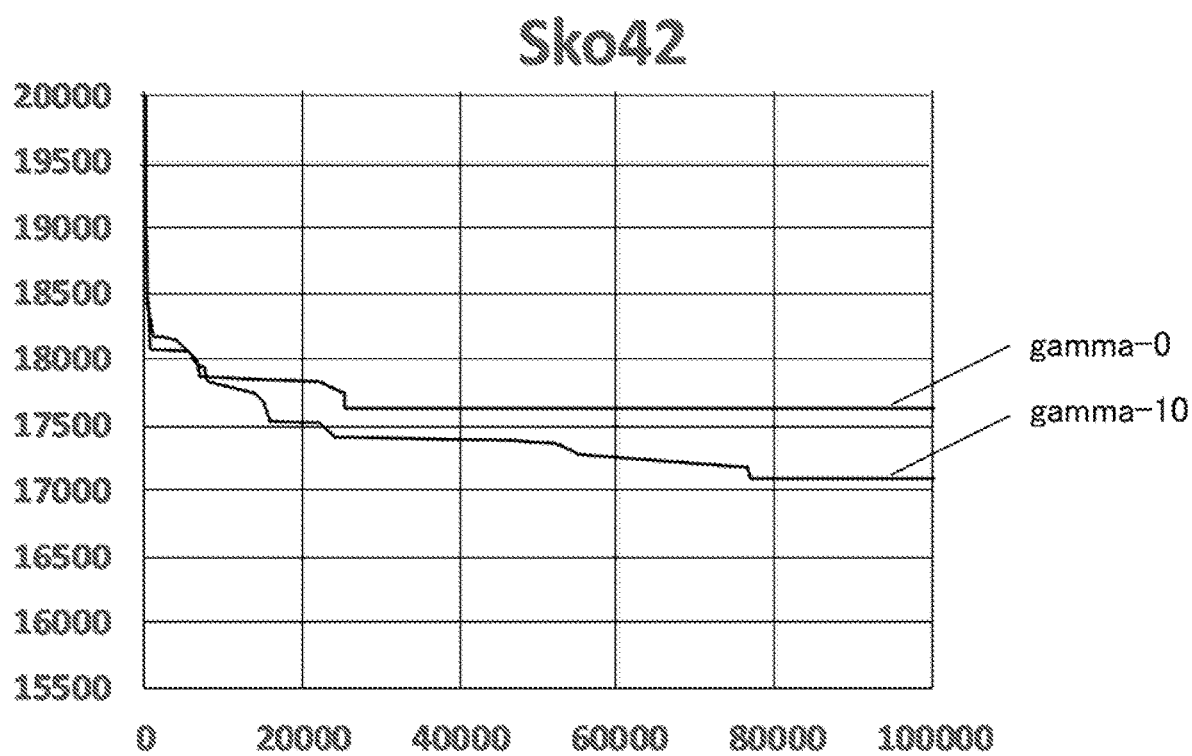
FIG. 21 illustrates a second verification example.

Verification examples in which effects are checked will be described with reference to FIGS. 20 and 21. FIG. 20 illustrates a first verification example. FIG. 21 illustrates a second verification example. The examples illustrated in FIGS. 20 and 21 are verification results regarding several instances of a representative combinatorial optimization problem called a quadratic assignment problem (QAP).

Equation (17) described above is used to compute the proposal probability of each bit according to the proposal distribution. As energy of interaction between replicas, a linear function of the Hamming distance represented by Equation (19) described above is used. The third update bit selection process (rejection-free) is used as the update bit selection method.

The examples of FIGS. 20 and 21 compare a difference in a decrease in energy depending on presence or absence of interaction between replicas in a solution search method that uses the single-bit flip transition and replica exchange. The horizontal axis represents the repetition count of the state transition, and the vertical axis represents the minimum value of energy obtained at that time. Let γ (written as "gamma" in FIGS. 20 and 21) be a parameter of the repulsive interaction. A comparison is made on a decrease in energy between the case of gamma=0 and the case of gamma <0 (for example, in the case where repulsive interaction is present and in the case where repulsive interaction is absent).

In the example of FIG. 20, the energy decreases faster in the case where the repulsive interaction is introduced (gamma−3) than in the case where no interaction is introduced (gamma−0). Also in the example of FIG. 21, the energy decreases faster in the case where the repulsive interaction is introduced (gamma−1) than in the case where no interaction is introduced (gamma−0).

As described above, introduction of interaction between replicas improves the solution searching performance. Since the interaction between replicas is reflected in the proposal probability and the objective function is not modified, a solution search using an appropriate objective function (for example, a function indicating a Gibbs distribution) may be performed.

The method called CMC described in NPL 1 is a method applicable to an objective function whose domain is real numbers, and is not directly applicable to an objective function of an Ising machine whose domain is a two-valued discrete space (binary variables). The CMC counts the number (density) of replicas that are close to each other. However, when the overall state of all replicas is observed in the case of the single-bit flip, the state does not largely change before and after the flipping. Therefore, a ratio between densities of the numbers of replicas before and after the flipping of a certain bit is close to approximately 1, and an effect of interaction between the replicas decreases if the two-valued discrete space is set as the domain. In contrast, the method described in the second embodiment is applicable to a combinatorial optimization problem whose domain is a two-valued discrete space and the solution performance also improves.

In the method called RE described in NPL 2, since interaction between replicas is directly added to an objective function, there is no guarantee that optimization is performed based on the original objective function. In contrast, in the method described in the second embodiment, interaction between replicas is reflected in a proposal probability, enabling a solution search using an appropriate objective function.

OTHER EMBODIMENTS

In the second embodiment, temperature exchange is performed between replicas. However, solution searches may be individually performed with a plurality of replicas without performing temperature exchange between the replicas. Even in such a case, the solution search capability is improved by the solution search performed in consideration of interaction between replicas.

In the second embodiment, solving is performed using an Ising model whose domain is a two-valued discrete space. However, the second embodiment is also applicable to the case where solving is performed using, as replicas, a model whose domain is real numbers.

In the second embodiment, a solution search is performed by the Ising machine 300 including the plurality of neuron circuits 311, 312, . . . , 31n. However, the same process may be implemented by a Neumann-type computer having substantially the same hardware configuration as the server 100 illustrated in FIG. 2. In this case, the Ising machine 300 performs substantially the same solution search process as that of the second embodiment by executing, for example, a program recorded in a computer-readable recording medium. The program in which content of processes to be executed by the Ising machine 300 is described may be recorded on various recording media. For example, the program to be executed by the Ising machine 300 may be stored in the storage device. The processor of the Ising machine 300 loads at least part of the program stored in the storage device into the memory and executes the program. The program to be executed by the Ising machine 300 may be recorded on a portable recording medium such as an optical disc, a memory device, or a memory card. For example, the program stored on the portable recording medium may be installed in the storage device and executed under the control of the processor of the Ising machine 300. The processor of the Ising machine 300 may read the program directly from the portable recording medium and execute the program.

While the embodiments are exemplified above, the configuration of each unit described in the embodiments may be replaced with another configuration having substantially the same function. Any other constituents or processes may be added. Any two or more of the configurations (features) described in the embodiments above may be combined with each other.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization device comprising:
a storage circuit configured to store values of a plurality of state variables of each of a plurality of replicas; and
a processing circuit configured to perform solution search processing, the solution search processing including:
identifying, for each of the plurality of replicas, an amount of change in strength of interaction that corresponds to a change in a distance between the replica and another replica in a state space in a case where a value of a first state variable among the plurality of state variables of the replica is updated, the state space indicating a space which a combination of values of the plurality of state variables is able to take;
determining whether or not to update the value of the first state variable, based on a proposal probability that corresponds to the amount of change in the strength of interaction in the case where the value of the first state variable is updated and based on an acceptance probability that corresponds to a target probability distribution;

in response to determining that the value of the first state variable is updated, identifying a value of an objective function based on a combination of values of the plurality of state variables of the replica obtained after the value of the first state variable is updated, and updating the value of the first state variable of the replica stored in the storage circuit;

repeatedly updating a value of one of the plurality of state variables of each of the plurality of replicas to minimize the value of the objective function; wherein the objective function is defined based on an optimization of an energy model and outputting a solution as a combination of values of the plurality of state variables set when the value of the objective function satisfies a predetermined condition.

2. The optimization device according to claim 1, the processing further including:

in a case where the distance between the replica and the other replica increases in response to updating of the value of the first state variable, increases the strength of interaction; and increases the proposal probability as an amount of increase in the strength of interaction increases.

3. The optimization device according to claim 1, the processing further including:

in a case where the distance between the replica and the other replica decreases in response to updating of the value of the first state variable, increases the strength of interaction; and increases the proposal probability as an amount of increase in the strength of interaction increases.

4. The optimization device according to claim 1, wherein the processing uses, as the proposal probability, a value obtained by dividing $\exp(-\beta\Delta G)$ by a predetermined normalization constant, where $\Delta G$ denotes the amount of change in the strength of interaction in the case where the value of the first state variable is updated and 13 denotes an inverse temperature that is a reciprocal of a value of a temperature parameter set in the replica.

5. The optimization device according to claim 1, wherein the processing uses, as the proposal probability, a value obtained by dividing a smaller value among 1 and $\exp(-\beta\Delta G)$ by a predetermined normalization constant, where $\Delta G$ denotes the amount of change in the strength of interaction in the case where the value of the first state variable is updated and f denotes an inverse temperature that is a reciprocal of a value of a temperature parameter set in the replica.

6. The optimization device according to claim 4, wherein the processing uses, as the normalization constant, a total sum of values of $\exp(-\beta\Delta G)$ obtained for the plurality of state variables in a case where each of the plurality of state variables is set as the first state variable.

7. The optimization device according to claim 4, the processing further including:

repeating determining of the first state variable to be updated by the replica and updating of the determined first state variable; and in computing of the normalization constant, computing a value of the normalization constant used in determining of the first state variable to be updated this time, based on a value of the normalization constant used in determining of the first state variable updated last time and a difference between values of the normalization constant before and after updating of the first state variable last time.

8. The optimization device according to claim 1, wherein the processing uses, as the strength of interaction, a value based on a sum of the distances between the replica and the other replicas.

9. The optimization device according to claim 1, wherein the processing uses, as the strength of interaction, a value based on a sum of square roots of the distances between the replica and the other replicas.

10. The optimization device according to claim 1, the processing further including:

determining, for each of the plurality of state variables, based on the acceptance probability, whether or not to accept updating of the state variable in a case where the updating is proposed, and determining, from among state variables for which it is determined that the updating is accepted, at least one state variable as an update target by increasing a selection possibility for a state variable having a higher proposal probability.

11. An optimization method for a solution search implemented by an optimization device, the optimization method comprising:

identifying, for each of a plurality of replicas each of which has a plurality of state variables, an amount of change in strength of interaction that corresponds to a change in a distance between the replica and another replica in a state space in a case where a value of a first state variable among the plurality of state variables of the replica is updated, the state space indicating a space which a combination of values of the plurality of state variables is able to take;

determining whether or not to update the value of the first state variable, based on a proposal probability that corresponds to the amount of change in the strength of interaction in the case where the value of the first state variable is updated and based on an acceptance probability that corresponds to a target probability distribution;

in response to determining that the value of the first state variable is updated, identifying a value of an objective function based on a combination of values of the plurality of state variables of the replica obtained after the value of the first state variable is updated, and updating the value of the first state variable of the replica stored in the storage circuit;

repeatedly updating a value of one of the plurality of state variables of each of the plurality of replicas to minimize the value of the objective function; wherein the objective function is defined based on an optimization of an energy model and outputting a solution as a combination of values of the plurality of state variables set when the value of the objective function satisfies a predetermined condition.

12. A non-transitory computer-readable storage medium for storing an optimization program which causes a processor to perform solution search processing, the solution search processing comprising:

computing, for each of a plurality of replicas each of which has a plurality of state variables, an amount of change in strength of interaction that corresponds to a change in a distance between the replica and another replica in a state space in a case where a value of a first state variable among the plurality of state variables of the replica is updated, the state space indicating a space which a combination of values of the plurality of state variables is able to take;

determining whether or not to update the value of the first state variable, based on a proposal probability that corresponds to the amount of change in the strength of interaction in the case where the value of the first state variable is updated and based on an acceptance probability that corresponds to a target probability distribution;

in response to determining that the value of the first state variable is updated, identifying a value of an objective function based on a combination of values of the plurality of state variables of the replica obtained after the value of the first state variable is updated, and updating the value of the first state variable of the replica stored in the storage circuit;

repeatedly updating a value of one of the plurality of state variables of each of the plurality of replicas to minimize the value of the objective function; wherein the objective function is defined based on an optimization of an energy model and outputting a solution as a combination of values of the plurality of state variables set when the value of the objective function satisfies a predetermined condition.

* * * * *